US012601399B2

(12) United States Patent
Kageyama et al.

(10) Patent No.: US 12,601,399 B2
(45) Date of Patent: Apr. 14, 2026

(54) LUBRICATION CONTROL APPARATUS FOR AUTOMATIC TRANSMISSION

(71) Applicant: Mazda Motor Corporation, Hiroshima (JP)

(72) Inventors: Keitaro Kageyama, Aki-gun (JP); Manabu Sasahara, Aki-gun (JP); Tomokazu Kinoshita, Aki-gun (JP); Shigeyoshi Okunishi, Aki-gun (JP); Masahiro Miyazaki, Aki-gun (JP); Toshiaki Shirasago, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 32 days.

(21) Appl. No.: 18/963,828

(22) Filed: Nov. 29, 2024

(65) Prior Publication Data

US 2025/0180106 A1    Jun. 5, 2025

(30) Foreign Application Priority Data

Dec. 5, 2023    (JP) ................................. 2023-205351

(51) Int. Cl.
*F16H 57/04*            (2010.01)
(52) U.S. Cl.
CPC ..... *F16H 57/0473* (2013.01); *F16H 57/0413* (2013.01); *F16H 57/0415* (2013.01); *F16H 57/0435* (2013.01); *F16H 57/0439* (2013.01)
(58) Field of Classification Search
CPC ............. F16H 57/0473; F16H 57/0413; F16H 57/0415; F16H 57/0435; F16H 57/0439; F16H 57/0417; F16H 2200/006; F16H 2200/2012; F16H 2200/2043
See application file for complete search history.

(56) References Cited

U.S. PATENT DOCUMENTS

| | | | | |
|---|---|---|---|---|
| 11,300,168 B2* | 4/2022 | Okubo | ..................... | F16D 55/40 |
| 2003/0213296 A1* | 11/2003 | Kaigawa | ................. | F16H 61/16 |
| | | | | 73/115.02 |
| 2008/0076632 A1* | 3/2008 | Watanabe | ............... | F16H 61/12 |
| | | | | 477/98 |
| 2009/0247359 A1* | 10/2009 | Matsuo | ................... | F16H 61/16 |
| | | | | 701/55 |
| 2017/0241538 A1* | 8/2017 | Tokozakura | ........ | F16H 57/0434 |
| 2021/0062875 A1* | 3/2021 | Kinoshita | ........... | F16H 57/0446 |
| 2021/0062915 A1* | 3/2021 | Kinoshita | ........... | F16H 57/0409 |
| 2021/0102620 A1* | 4/2021 | Kinoshita | ............... | F16H 59/72 |
| 2021/0102621 A1* | 4/2021 | Kinoshita | ............. | F16H 57/043 |

FOREIGN PATENT DOCUMENTS

JP        2021-060060 A    4/2021

* cited by examiner

*Primary Examiner* — Lori Wu
(74) *Attorney, Agent, or Firm* — XSENSUS LLP

(57)            ABSTRACT

A lubrication control apparatus for an automatic transmission includes a first lubrication circuit that supplies lubricating oil to a starting frictional engagement element to be engaged when a vehicle starts, a second lubrication circuit that supplies the lubricating oil to a lubricated portion other than the starting frictional engagement element, and a controller that performs control to increase a flow rate in the first lubrication circuit while limiting a flow rate in the second lubrication circuit when a temperature of the starting frictional engagement element is equal to or higher than a threshold temperature, and the controller changes the threshold temperature in accordance with the temperature of the lubricating oil.

20 Claims, 12 Drawing Sheets

| | CL1 | CL2 | CL3 | BR1 | BR2 |
|---|---|---|---|---|---|
| FIRST GEAR | ○ | | | ○ | ○ |
| SECOND GEAR | | ○ | | ○ | ○ |
| THIRD GEAR | ○ | ○ | | | ○ |
| FOURTH GEAR | | ○ | ○ | | ○ |
| FIFTH GEAR | ○ | | ○ | | ○ |
| SIXTH GEAR | ○ | ○ | ○ | | |
| SEVENTH GEAR | ○ | | ○ | ○ | |
| EIGHTH GEAR | | ○ | ○ | ○ | |
| REVERSE GEAR | | | ○ | ○ | ○ |

FIG. 2

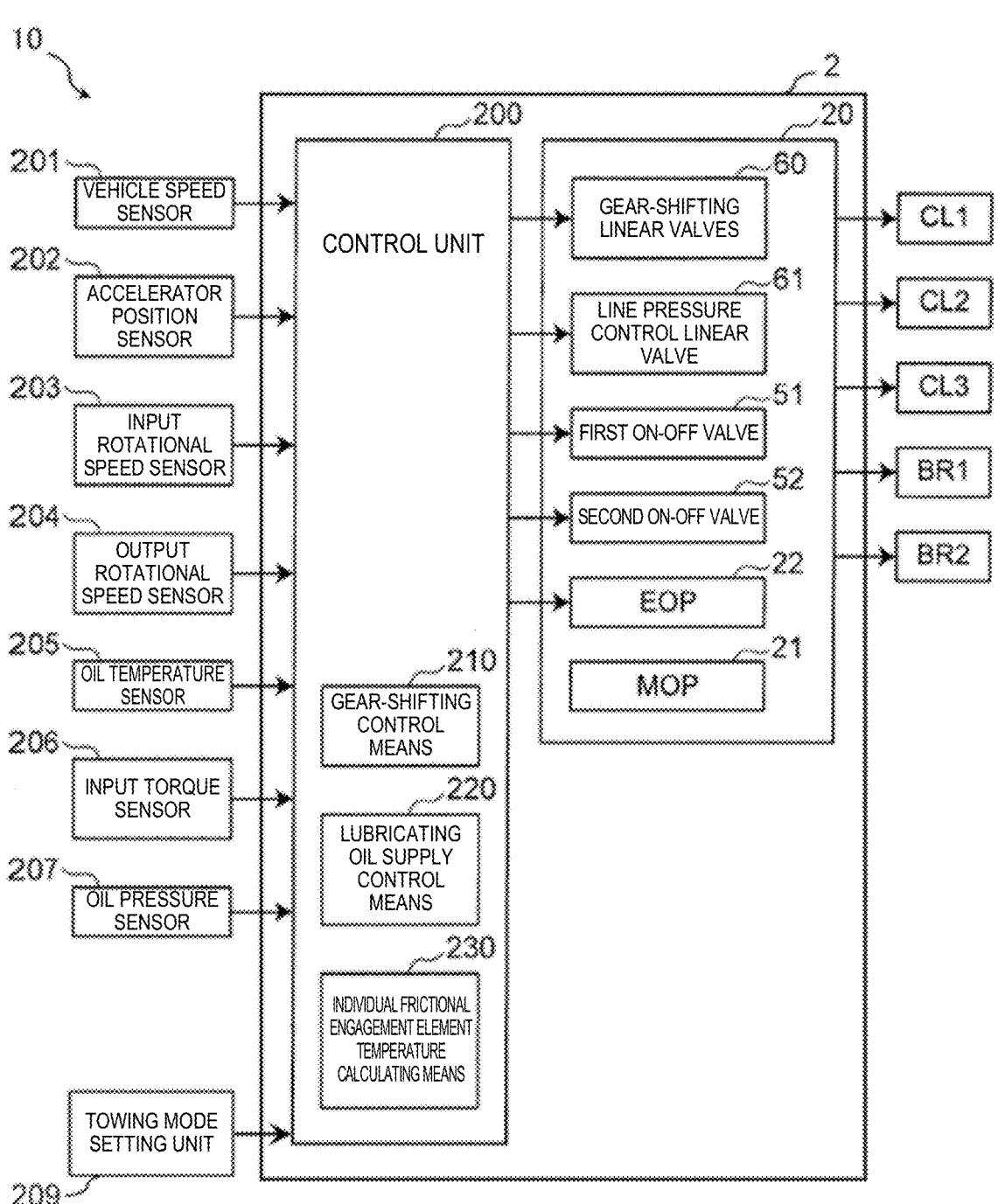

10

201 VEHICLE SPEED SENSOR

202 ACCELERATOR POSITION SENSOR

203 INPUT ROTATIONAL SPEED SENSOR

204 OUTPUT ROTATIONAL SPEED SENSOR

205 OIL TEMPERATURE SENSOR

206 INPUT TORQUE SENSOR

207 OIL PRESSURE SENSOR

209 TOWING MODE SETTING UNIT

200 CONTROL UNIT

210 GEAR-SHIFTING CONTROL MEANS

220 LUBRICATING OIL SUPPLY CONTROL MEANS

230 INDIVIDUAL FRICTIONAL ENGAGEMENT ELEMENT TEMPERATURE CALCULATING MEANS

2

20

60 GEAR-SHIFTING LINEAR VALVES

61 LINE PRESSURE CONTROL LINEAR VALVE

51 FIRST ON-OFF VALVE

52 SECOND ON-OFF VALVE

22 EOP

21 MOP

| LUBRICATING OIL SUPPLY PATTERN | PATTERN 1 PRIORITY TO FUEL EFFICIENCY | PATTERN 2 PRIORITY TO CLUTCHES COOLING | PATTERN 3 PRIORITY TO SECOND BRAKE COOLING | PATTERN 4 CLUTCHES AND SECOND BRAKE COOLING | PATTERN 5 MAXIMUM SECOND BRAKE COOLING | PATTERN 6 SECOND BRAKE AND LUBRICATING OIL COOLING |
|---|---|---|---|---|---|---|
| COOLING REQUIREMENT LEVEL | BR2: L / CL1·CL2·CL3: L / ATF: - | BR2: L / CL1·CL2·CL3: H / ATF: - | BR2: H / CL1·CL2·CL3: L / ATF: - | BR2: H / CL1·CL2·CL3: H / ATF: - | BR2: HH / CL1·CL2·CL3: - / ATF: - | BR2: H / CL1·CL2·CL3: - / ATF: H |
| COMMUNICATING STATE OF LUBRICATING OIL PASSAGE COMMUNICATING WITH EACH FRICTIONAL ENGAGEMENT ELEMENT | f1 / f2 / fb | f1 / f2 / fb | f1 / f2 / fb | f1 / f2 / fb | f1 / f2 / fb | f1 / f2 / fb |
| AMOUNT OF LUBRICATING OIL SUPPLIED TO EACH FRICTIONAL ENGAGEMENT ELEMENT | BR2: ○ ; CL: × ; FIRST FLOW RATE (LOW) / SECOND FLOW RATE (LOW) | BR2: ○ × ; CL: ○ ; FIRST FLOW RATE (LOW) / THIRD FLOW RATE (HIGH) | BR2: ○ ○ ; CL: ○ × ; FOURTH FLOW RATE (HIGH) / SECOND FLOW RATE (LOW) | BR2: ○ ○ × ; CL: ○ ; FOURTH FLOW RATE (HIGH) / THIRD FLOW RATE (HIGH) | BR2: ○ ○ ○ ; CL: × ; FIFTH FLOW RATE (EXTRA-HIGH) / SECOND FLOW RATE (LOW) | BR2: ○ ○ × ; CL: ○ ; SIXTH FLOW RATE (HIGH) / THIRD FLOW RATE (HIGH) |
| ASSUMED SCENE | LIGHT LOAD LOW ROTATIONAL SPEED FUEL-EFFICIENT TRAVELING | MEDIUM LOAD DURING ACCELERATION DURING UPSHIFT | HIGH LOAD DURING UPHILL TRAVELING TRAVELING IN TRAFFIC CONGESTION | MEDIUM LOAD DURING ACCELERATION DURING UPSHIFT FAIL-SAFE | TOWING MODE HILL HOLD | HIGH ATF TEMPERATURE TOWING MODE HILL HOLD |

FIG. 6

LUBRICATION CONTROL APPARATUS FOR AUTOMATIC TRANSMISSION

CROSS-REFERENCE TO RELATED APPLICATION

The present application claims priority to Japanese Patent Application 2023-205351, filed Dec. 5, 2023, the entire contents of which are incorporated herein by reference.

FIELD

The present disclosure relates to a lubrication control apparatus for an automatic transmission, and particularly belongs to the technical field of a lubrication structure for a frictional engagement element of an automatic transmission mounted on a vehicle such as an automobile.

DESCRIPTION OF THE RELATED ART

An automatic transmission mounted on a vehicle includes a plurality of frictional engagement elements for switching a power transmission path, and a hydraulic control apparatus that includes a plurality of solenoid valves and controls the supply and discharge of operating oil to and from these frictional engagement elements, and is configured to engage/disengage each of the frictional engagement elements by controlling the operation of the solenoid valves in accordance with a control signal from a control unit to achieve a shift stage corresponding to the operating state of the vehicle.

The plurality of frictional engagement elements constituting the automatic transmission include a starting frictional engagement element to be engaged when the vehicle starts. In particular, in an automatic transmission in which a fluid transmission device typified by a torque converter is eliminated, a smooth start is achieved by performing control to gradually engage the starting frictional engagement element while slipping it. At this time, a friction plate of the starting frictional engagement element generates heat due to sliding friction caused by the slip, which may reduce durability.

Wet frictional engagement elements in which lubricating oil is supplied between friction plates may be used as the frictional engagement elements of the automatic transmission, and, in particular, it is desirable to supply a larger amount of lubricating oil to the starting frictional engagement element than to a lubricated portion such as the frictional engagement elements other than the starting frictional engagement element and a main shaft in accordance with the operating state of the vehicle to appropriately cool the starting frictional engagement element. For example, Patent Literature 1 discloses one that switches the amount of lubricating oil to be supplied in accordance with the temperature of the starting frictional engagement element.

According to the configuration of Patent Literature 1, for example, when an excessive heat load is applied to the starting frictional engagement element, such as during accelerator hill hold or towing, the flow rate of in a lubrication circuit for supplying lubricating oil to the starting frictional engagement element is increased, thereby ensuring the durability of the starting frictional engagement element.

CITATION LIST

Patent Literature

[Patent Literature 1] Japanese Patent Laid-Open No. 2021-60060

SUMMARY

The lubrication control apparatus for an automatic transmission described in Patent Literature 1 increases the amount of lubricating oil supplied to the starting frictional engagement element while limiting the amount of lubricating oil supplied to the frictional engagement elements other than the starting frictional engagement element when the temperature of the starting frictional engagement element is equal to or higher than a threshold temperature, so that the temperature of the lubricating oil is likely to rise while the durability of the starting frictional engagement element is ensured.

When the temperature of the lubricating oil becomes high, leakage from a seal portion due to reduction in the viscosity of the lubricating oil and deterioration in the performance of a component disposed inside an oil pan may be caused, and a lubrication control apparatus may take into consideration restraining temperature rises in both the temperature of the starting frictional engagement element and the temperature of the lubricating oil.

Thus, one or more embodiments may provide a lubrication control apparatus for an automatic transmission that can restrain temperature rises in both the temperature of a starting frictional engagement element and the temperature of lubricating oil, and ensure the durability of not only the starting frictional engagement element but also an internal component affected by the temperature of the lubricating oil.

Solutions

One or more embodiments may provide a lubrication control apparatus that controls lubricating oil of an automatic transmission, characterized by including: a first lubrication circuit that supplies the lubricating oil to a starting frictional engagement element to be engaged when a vehicle starts; a second lubrication circuit that supplies the lubricating oil to a lubricated portion other than the starting frictional engagement element; and a controller that increases a flow rate of the lubricating oil supplied by the first lubrication circuit while limiting a flow rate of the lubricating oil supplied by the second lubrication circuit when a temperature of the starting frictional engagement element is equal to or higher than a threshold temperature, in which the controller changes the threshold temperature in accordance with a temperature of the lubricating oil.

In an embodiment configured in this manner, by changing the threshold temperature, the weighting of the cooling priority can be changed between the starting frictional engagement element and the lubricating oil in accordance with the lubricating oil temperature. This makes it possible to restrain temperature rises in both the temperature of the starting frictional engagement element and the temperature of the lubricating oil. Thus, the durability of the starting frictional engagement element and the internal component affected by the lubricating oil temperature is ensured.

In an implementation, the controller performs control to increase the threshold temperature as the temperature of the lubricating oil increases.

In an implementation, by reducing the starting frictional engagement element temperature range in which the flow rate of the lubricating oil supplied to the starting frictional engagement element is increased as the temperature of the lubricating oil is increased, it is possible to make the temperature of the lubricating oil unlikely to rise while also taking into consideration cooling of the starting frictional engagement element. This makes it possible to restrain temperature rises of both the starting frictional engagement element and the lubricating oil, and the durability of the starting frictional engagement element and the internal component affected by the lubricating oil temperature is ensured.

In an implementation, when the threshold temperature in a case where the temperature of the lubricating oil is lower than a predetermined temperature is defined as a first threshold temperature, the controller performs control to set the threshold temperature in a case where the temperature of the lubricating oil is equal to or higher than the predetermined temperature to a second threshold temperature higher than the first threshold temperature.

In an implementation, when the temperature of the lubricating oil is high, by reducing the starting frictional engagement element temperature range in which the flow rate of the lubricating oil supplied to the starting frictional engagement element is increased, it is possible to make the temperature of the lubricating oil unlikely to rise. This makes it possible to restrain temperature rises of both the starting frictional engagement element and the lubricating oil, and the durability of the starting frictional engagement element and the lubricating oil is ensured. In addition, making a pattern as two-stage thresholds based on the threshold for the temperature of the lubricating oil enables both appropriate restriction of the temperature rise and elimination of the complicated control related to threshold setting.

In an implementation, an oil cooler that cools the lubricating oil may be included, and the second lubrication circuit may supply the lubricating oil to the lubricated portion through the oil cooler.

In an implementation, the second lubrication circuit that functions as the circuit for restraining the temperature rise of the lubricating oil is further provided with the oil cooler, thereby making it possible to further enhance the effect of restraining the temperature rise of the lubricating oil.

In an implementation, a first oil supply connected to the first lubrication circuit and the second lubrication circuit may be included, in which a source pressure of the lubricating oil supplied by the first oil supply is constant.

In an implementation, since the load of a drive source (engine) used to operate the first oil supply can be maintained constant, the operating load does not cause reduction in fuel efficiency.

In an implementation, a second oil supply connected to the first lubrication circuit may be further included, in which the controller performs control to operate the second oil supply in accordance with the temperature of the starting frictional engagement element to supply the lubricating oil to the starting frictional engagement element.

Since the starting frictional engagement element performs slip control, the amount of heat generation (the temperature rise rate) is remarkably larger than that in the lubricated portion. In an implementation, control is performed to additionally operate the second oil supply in a state in which the first oil supply is operating in accordance with the temperature of the starting frictional engagement element. Accordingly, since the starting frictional engagement element is appropriately cooled by appropriately supplying a required large amount of lubricating oil to the starting frictional engagement element, the durability of the starting frictional engagement element can be ensured.

In an implementation, the first lubrication circuit includes a first main lubrication circuit that supplies the lubricating oil to the starting frictional engagement element, and a first lubricating oil increasing circuit branching off from the first main lubrication circuit, the first lubricating oil increasing circuit is provided with a first opening-closing valve, and the first opening-closing valve is configured to increase a flow rate in the first lubrication circuit by being changed from a closed state to an open state.

In an implementation, when the temperature of the starting frictional engagement element is equal to or higher than the threshold (e.g., threshold temperature), the flow rate in the first lubrication circuit is increased by changing the first opening-closing valve from a closed state to an open state, thereby facilitating supplying more lubricating oil to the starting frictional engagement element to which lubricating oil should be supplied on a priority basis, and the durability of the starting frictional engagement element is ensured.

In an implementation, the second lubrication circuit includes a second main lubrication circuit that supplies the lubricating oil to the lubricated portion, and a second lubricating oil increasing circuit branching off from the second main lubrication circuit, the second lubricating oil increasing circuit is provided with a second opening-closing valve, and the second opening-closing valve is configured to limit a flow rate in the second lubrication circuit by being changed from an open state to a closed state.

In an implementation, when the temperature of the starting frictional engagement element is equal to or higher than the threshold, by limiting the supply of lubricating oil to the lubricated portion by changing the second opening-closing valve from an open state to a closed state, lubricating oil corresponding to the limited amount can be supplied to the starting frictional engagement element. This facilitates supplying more lubricating oil to the starting frictional engagement element to which lubricating oil should be supplied on a priority basis, and the durability of the starting frictional engagement element is ensured.

In an implementation, a towing mode setter may be further included, in which the controller performs control such that the threshold is changed in accordance with the temperature of the lubricating oil when a towing mode is set by the towing mode setter.

During towing, the transmission torque is large, the amount of heat generated by slip control of the starting frictional engagement element is remarkably large, and the temperature of the lubricating oil is also likely to rise. Thus, in an implementation, it is possible to restrain temperature rises of both the starting frictional engagement element and the lubricating oil during towing. Accordingly, the durability of the starting frictional engagement element and the internal component affected by the temperature of the lubricating oil is ensured.

In an implementation, the first oil supply is a mechanical oil pump that is mechanically driven by a drive source.

In an implementation, since the existing mechanical oil pump can be used, it is possible to appropriately execute lubrication control without making the configuration complicated.

In an implementation, the second oil supply is an electrical oil pump that is provided independent of a drive source.

In an implementation, since the electrical oil pump is independent of the operation of the drive source, it is possible to additionally supply the lubricating oil at any time and in any supply amount.

In an implementation, the starting frictional engagement element is a brake that forms a first gear of the automatic transmission, starts the vehicle through slip control, and then becomes an engaged state.

In an implementation, the slip control of the starting frictional engagement element that forms a first gear of the automatic transmission makes it possible to smoothly start the vehicle without using a starting mechanism such as a torque converter. Since centrifugal force does not act on the brake because a drum including a piston chamber does not rotate, the controllability of the brake is better than that of a clutch in which a drum including a piston chamber rotates, and more precise start control can be performed.

Advantages

According to an embodiment, it is possible to restrain temperature rises in both the temperature of the starting frictional engagement element and the temperature of the lubricating oil, and ensure the durability of the automatic transmission including not only the starting frictional engagement element but also the internal component affected by the temperature of the lubricating oil.

BRIEF DESCRIPTION OF THE DRAWINGS

FIG. 2 is an engagement table of the automatic transmission of FIG. 1.

FIG. 3 is a block diagram showing the entire system of the automatic transmission according to an embodiment.

FIG. 6 is a table showing lubricating oil supply patterns for the automatic transmission according to an embodiment.

DETAILED DESCRIPTION

Hereinbelow, details of a lubrication control apparatus for an automatic transmission according to an embodiment will be described with reference to the accompanying drawings.

Figure 1:
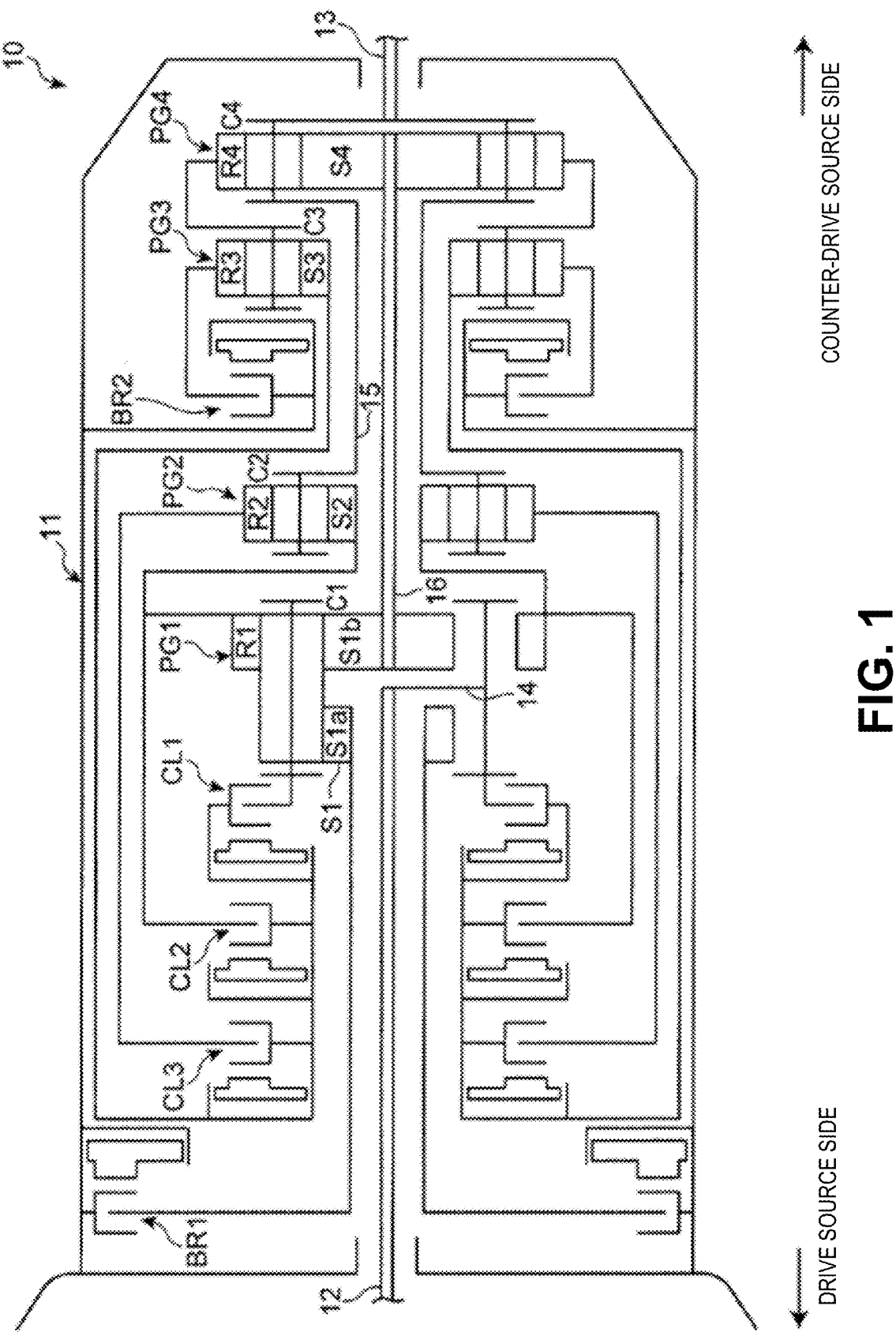
FIG. 1 is a schematic diagram of an automatic transmission according to an embodiment.

FIG. 1 is a schematic diagram showing the configuration of an automatic transmission 10 according to the present embodiment. The automatic transmission 10 is coupled to a drive source such as an engine without a fluid transmission device such as a torque converter interposed therebetween. As shown in FIG. 1, the automatic transmission 10 includes a transmission case 11, an input shaft 12 that is connected to the drive source and disposed on the drive source side (the left side of the drawing), and an output shaft 13 that is disposed on the counter-drive source side (the right side of the drawing). The automatic transmission 10 is a longitudinally mounted type for a front-engine rear-drive vehicle in which the input shaft 12 and the output shaft 13 are disposed on the same axis.

First, second, third, and fourth planetary gear sets (hereinbelow, simply referred to as the "first, second, third, and fourth gear sets") PG1, PG2, PG3, PG4 are disposed on the axes of the input shaft 12 and output shaft 13 from the drive source side.

Inside the transmission case 11, a first clutch CL1 is disposed on the drive source side of the first gear set PG1, a second clutch CL2 is disposed on the drive source side of the first clutch CL1, and a third clutch CL3 is disposed on the drive source side of the second clutch CL2. In addition, a first brake BR1 is disposed on the drive source side of the third clutch CL3, and a second brake BR2 is disposed on the drive source side of the third gear set PG3 and on the counter-drive source side of the second gear set PG2.

The first, second, third, and fourth gear sets PG1, PG2, PG3, PG4 are all single-pinion type gear sets in which a pinion directed by a carrier directly meshes with a sun gear and a ring gear. The first, second, third, and fourth gear sets PG1, PG2, PG3, PG4 respectively include sun gears S1, S2, S3, S4, ring gears R1, R2, R3, R4, and carriers C1, C2, C3, C4 as rotation elements.

The first gear set PG1 is a double sun gear type in which the sun gear S1 is divided into two parts in the axial direction. The sun gear S1 includes a first sun gear S1$a$ disposed on the drive source side in the axial direction, and a second sun gear S1$b$ disposed on the counter-drive source side. The first and second sun gears S1$a$, S1$b$ have the same number of teeth and mesh with the same pinion supported by the carrier C1. Accordingly, the first and second sun gears S1$a$, S1$b$ always rotate identically.

In the automatic transmission 10, the sun gear S1 of the first gear set PG1 and the sun gear S4 of the fourth gear set PG4 are always coupled to each other. In an implementation, the second sun gear S1$b$ and the sun gear S4 of the fourth gear set PG4 are always coupled to each other. In addition, in the automatic transmission 10, the ring gear R1 of the first gear set PG1 and the sun gear S2 of the second gear set PG2 are always coupled to each other, the carrier C2 of the second gear set PG2 and the carrier C4 of the fourth gear set PG4 are always coupled to each other, and the carrier C3 of the third gear set PG3 and the ring gear R4 of the fourth gear set PG4 are always coupled to each other.

The input shaft 12 is always coupled to the carrier C1 of first gear set PG1 through between the first sun gear S1$a$ and the second sun gear S1$b$. The output shaft 13 is always coupled to the carrier C4 of the fourth gear set PG4. In an implementation, the input shaft 12 is joined to the first carrier C1 through a power transmission member 14 that passes between the pair of first sun gears S1$a$, S1$b$, and the fourth carrier C4 is joined to the second carrier C2 through a power transmission member 15.

The first clutch CL1 is disposed between the input shaft 12 and the carrier C1 of the first gear set PG1 and the sun gear S3 of the third gear set PG3 to connect and disconnect them. The second clutch CL2 is disposed between the ring gear R1 of the first gear set PG1 and the sun gear S2 of the second gear set PG2 and the sun gear S3 of the third gear set PG3 to connect and disconnect them. The third clutch CL3 is disposed between the ring gear R2 of the second gear set PG2 and the sun gear S3 of the third gear set PG3 to connect and disconnect them.

The first brake BR1 is disposed between the transmission case 11 and the sun gear S1 of the first gear set PG1 to connect and disconnect them. In an implementation, the first brake BR1 is disposed between the transmission case 11 and the first sun gear S1a. The second brake BR2 is disposed between the transmission case 11 and the ring gear R3 of the third gear set PG3 to connect and disconnect them.

FIG. 2 is an engagement table of the automatic transmission 10. The automatic transmission 10 constitutes any one of first to eighth gears in a D range and a reverse gear in an R range by a combination of the engaged states of the first clutch CL1, the second clutch CL2, the third clutch CL3, the first brake BR1, and the second brake BR2. In FIG. 2, "O" represents an engaged state. As an example, when the first clutch CL1, the first brake BR1, and the second brake BR2 are in an engaged state, it shows that the automatic transmission 10 is in the state of the first gear in the D range. In the present embodiment, the automatic transmission 10 forms any one of the first to eighth gears in the D range and the reverse gear in the R range by selecting and engaging three of the first clutch CL1, the second clutch CL2, the third clutch CL3, the first brake BR1, and the second brake BR2. In addition, the automatic transmission 10 includes a hydraulic control apparatus 2 that achieves shift stages by engaging and disengaging the first clutch CL1, the second clutch CL2, the third clutch CL3, the first brake BR1, and the second brake BR2 based on the engagement table of FIG. 2. Note that a configuration example of the hydraulic control apparatus 2 will be described further below.

Here, the first clutch CL1, the second clutch CL2, the third clutch CL3, the first brake BR1, and the second brake BR2 are elements having an engaged state. Thus, in the present embodiment, the first clutch CL1, the second clutch CL2, the third clutch CL3, the first brake BR1, and the second brake BR2 may be collectively referred to as frictional engagement elements. The second brake BR2 is one of the frictional engagement elements that form the first gear of the automatic transmission 10 and may thus be referred to as a starting frictional engagement element. In addition, the frictional engagement elements excluding the second brake BR2, which is the starting frictional engagement element, that is, the first clutch CL1, the second clutch CL2, the third clutch CL3, and the first brake BR1 may be collectively referred to as a lubricated portion.

Note that the second brake BR2 starts the vehicle by performing slip control when the vehicle starts, and is then engaged. The automatic transmission 10 including the second brake BR2 having such a characteristic can smoothly start the vehicle by gradually transmitting torque through slip control of the second brake BR2, without using a starting mechanism such as a torque converter.

Furthermore, since the brake has a structure in which a drum including a piston chamber used for engagement and disengagement does not rotate, centrifugal force caused by operating oil does not act, which enables better controllability and more precise start control than when a clutch with a rotating drum plays the role of the starting frictional engagement element.

Next, a configuration example of the automatic transmission 10 will be described with reference to FIG. 3. FIG. 3 is a block diagram showing the entire system of the automatic transmission 10 in the present embodiment.

As shown in FIG. 3, the automatic transmission 10 includes the first clutch CL1, the second clutch CL2, the third clutch CL3, the first brake BR1, and the second clutch BR2, each of which is the frictional engagement element. The automatic transmission 10 further includes the hydraulic control apparatus 2, a vehicle speed sensor 201, an accelerator position sensor 202, an input rotational speed sensor 203, an output rotational speed sensor 204, an oil temperature sensor 205, an input torque sensor 206, an oil pressure sensor 207, and a towing mode setting unit or towing mode setter 209.

The vehicle speed sensor 201 detects a traveling speed of the vehicle. The accelerator position sensor 202 detects an accelerator position indicating the amount of depression of an accelerator pedal. The input rotational speed sensor 203 detects an engine speed as an input rotational speed input to the automatic transmission 10. The output rotational speed sensor 204 detects an output rotational speed output from the automatic transmission 10. The oil temperature sensor 205 detects the temperature (ATF temperature) of lubricating oil (automatic transmission fluid, ATF) stored in an oil storage portion at the bottom of the transmission case 11 of the automatic transmission 10. The input torque sensor 206 detects the output torque of the engine as the input torque input to the automatic transmission 10. The oil pressure sensor 207 detects the oil pressure of the operating oil supplied to each frictional engagement element.

The towing mode setter 209 detects that an occupant has set a towing mode. When the towing mode is set, the towing mode setter 209 outputs that the towing mode is set as an input signal to be input to a control unit 200. Note that, when the towing mode is set, the towing mode setter 209 may also output whether the towing mode is set as an input signal. During towing traveling, a transmission torque capacity is larger than that during normal traveling, and, in response to this, the amount of heat generated by the slip control of the second brake BR2 also increases. Thus, the towing mode setter 209 executes lubrication control as the towing mode, which will be described further below, in order to appropriately cool the second brake BR2 to ensure durability.

The towing mode setter 209 is provided, for example, near a shift lever that is provided in the vehicle to change the range of the automatic transmission 10, and may be an operation portion having any shape, such as a dial shape, a push button shape, a knob, or a pull. Alternatively, as the towing mode setter 209, the towing mode may be set by an occupant operating a predetermined switch provided inside a vehicle cabin of the vehicle, or the towing mode may be set by detecting a connection to a device provided at a rear portion of the vehicle (e.g., a hitch member or a trailer hitch) for towing another vehicle or the like.

The hydraulic control apparatus 2 includes a hydraulic control circuit 20, and the control unit 200. The hydraulic control circuit 20 includes a mechanical oil pump (MOP) 21, an electrical oil pump (EOP) 22, a first on-off valve 51 for lubricating oil supply control, a second on-off valve 52 for lubricating oil supply control, a plurality of gear-shifting linear valves 60, and a line pressure control linear valve 61.

The mechanical oil pump 21 and the electrical oil pump 22 are hydraulic pressure supply sources and hydraulic pressure suppliers that provide hydraulic pressure to each of the frictional engagement elements. The mechanical oil pump 21 is mechanically driven by the engine that acts as the drive source. The electrical oil pump 22 is mainly driven by electricity when the engine is stopped such as during no idling. The electrical oil pump 22 is configured to be driven independently of the drive source and the mechanical oil pump 21 (e.g., the electrical oil 22 pump may be driven regardless of the operation of the drive source and the mechanical oil pump 21). Thus, the electrical oil pump 22 can additionally supply the lubricating oil at any time and in any supply amount appropriate to cooling performance for the second brake BR2. Note that, in the present embodiment, the mechanical oil pump 21 may be referred to as a first oil supplier, and the electrical oil pump 22 may be referred to as a second oil supplier.

The hydraulic control circuit 20 adjusts the pressure of the operating oil discharged from the mechanical oil pump 21 and the electrical oil pump 22 and generates an operating pressure for shift stage formation such as an engagement pressure or a disengagement pressure supplied to each of the first clutch CL1, the second clutch CL2, the third clutch CL3, the first brake BR1, and the second brake BR2, which are the frictional engagement elements, for gear-shifting control.

Furthermore, the hydraulic control circuit 20 supplies the lubricating oil to each of the first clutch CL1, the second clutch CL2, the third clutch CL3, the first brake BR1, and the second brake BR2, which are the starting frictional engagement element and the lubricated portion in the automatic transmission 10. In an implementation, an oil passage for supplying the lubricating oil discharged from the mechanical oil pump 21 is connected to a first lubrication circuit and a second lubrication circuit, which will be described further below, and an oil passage for supplying the lubricating oil discharged from the electrical oil pump 22 is connected to the second lubrication circuit, which will be described further below, to supply the lubricating oil to each frictional engagement element.

The first on-off valve 51 is turned on or off to control a control pressure to a lubricating oil increasing valve 34 for the second brake, which will be described further below. When the first on-off valve 51 is on, the control pressure is supplied to the lubricating oil increasing valve 34 for the second brake. On the other hand, when the first on-off valve 51 is off, the control pressure is not supplied to the lubricating oil increasing valve 34 for the second brake.

The second on-off valve 52 is turned on or off to control a control pressure to a lubricating oil increasing valve 35 for the first to third clutches, which will be described further below. When the second on-off valve 52 is on, the control pressure is supplied to the lubricating oil increasing valve 35 for the first to third clutches. On the other hand, when the second on-off valve 52 is off, the control pressure is not supplied to the lubricating oil increasing valve 35 for the first to third clutches.

The plurality of gear-shifting linear valves 60 are valves for generating an engagement hydraulic pressure. The plurality of gear-shifting linear valves 60 are supplied with a gear-shifting control source pressure from the hydraulic control circuit 20. Each of the plurality of gear-shifting linear valves 60 generates an engagement pressure and supplies the engagement pressure to an engagement chamber of each frictional engagement element in accordance with the shift stage. Then, the frictional engagement element supplied with the engagement pressure is engaged.

The line pressure control linear valve 61 is a valve for generating a line pressure. A control pressure generated by a reducing valve 41, which will be described further below, is guided to the line pressure control linear valve 61, and the line pressure control linear valve 61 generates a line pressure adjusting pressure for adjusting a set pressure of the line pressure to a predetermined pressure corresponding to the operating state of the vehicle.

The control unit 200 is a controller configured to control the hydraulic control circuit 20. The control unit 200 receives various external signals and controls the vehicle.

The control unit 200 receives detected signals detected by the vehicle speed sensor 201, the accelerator position sensor 202, the input rotational speed sensor 203, the output rotational speed sensor 204, the oil temperature sensor 205, the input torque sensor 206, and the oil pressure sensor 207.

The control unit 200 includes a gear-shifting control means or gear-shifting controller 210, a lubricating oil supply control means lubricating oil supply controller 220, and an individual frictional engagement element temperature calculating means or individual frictional engagement element temperature calculator 230. The control unit 200 includes, for example, a processor such as a central processing unit (CPU). The number of processors may be one, or more than one. The processor functions as the gear-shifting controller 210, the lubricating oil supply controller 220, and the individual frictional engagement element temperature calculator 230 by executing a predetermined program read from a storage device (storage unit). Note that each of the gear-shifting controller 210, the lubricating oil supply controller 220, and the individual frictional engagement element temperature calculator 230 may be configured by hardware.

The gear-shifting controller 210 receives detected values from various sensors including the vehicle speed sensor 201, the accelerator position sensor 202, the engine speed sensor 203, and the output rotational speed sensor 204. The gear-shifting controller 210 controls gear-shifting by outputting a control signal to the hydraulic control circuit 20 based on the detected values from the various sensors.

The lubricating oil supply controller 220 determines a lubricating oil supply destination and a lubricating oil supply amount for the automatic transmission 10 and performs lubricating oil supply control based on a plurality of lubricating oil supply patterns shown in FIG. 6. The lubricating oil supply patterns are previously stored in the storage unit of the control unit 200. Note that the lubricating oil supply patterns may, for example, be input from an external device. The lubricating oil supply controller 220 performs the lubricating oil supply control by outputting a control signal to the hydraulic control circuit 20 based on input signals from the input rotational speed sensor 203, the output rotational speed sensor 204, the oil temperature sensor 205, the input torque sensor 206, the oil pressure sensor 207, and the towing mode setter 209.

The lubricating oil supply controller 220 performs the lubricating oil supply control by switching the lubricating oil supply pattern for supply to each of the frictional engagement elements (the first clutch CL1, the second clutch CL2, the third clutch CL3, the first brake BR1, and the second brake BR2) in accordance with the operating state of the vehicle. By performing the lubricating oil supply control, the lubricating oil supply controller 220 reduces agitation resistance and drag resistance of the lubricating oil in each frictional engagement element and discharge loss of the oil pumps while reducing the heat load of each frictional engagement element, thereby improving fuel efficiency, and restrains reduction in the performance of the automatic transmission 10 caused by the temperature rise in the lubricating oil.

The individual frictional engagement element temperature calculator 230 calculates the temperature of each of the frictional engagement elements (the first clutch CL1, the second clutch CL2, the third clutch CL3, the first brake BR1, and the second brake BR2). The individual frictional engagement element temperature calculator 230 calculates the temperature of each of the frictional engagement elements for each predetermined cycle, and calculates a temperature drop rate of the frictional engagement elements using a map showing the cooling characteristics of the temperature of each of the frictional engagement elements in the automatic transmission shown in FIG. 7. Note that a plurality of individual frictional engagement element temperature calculator 230 may be provided corresponding one-to-one to the frictional engagement elements, or only one individual frictional engagement element temperature calculator 230 may be provided. When a plurality of individual frictional engagement element temperature calculator 230 are provided, among the plurality of individual frictional engagement element temperature calculator 230, the individual frictional engagement element temperature calculator 230 that calculates the temperature of the second brake BR2 may be referred to as the starting frictional engagement element temperature calculator.

Figure 4:
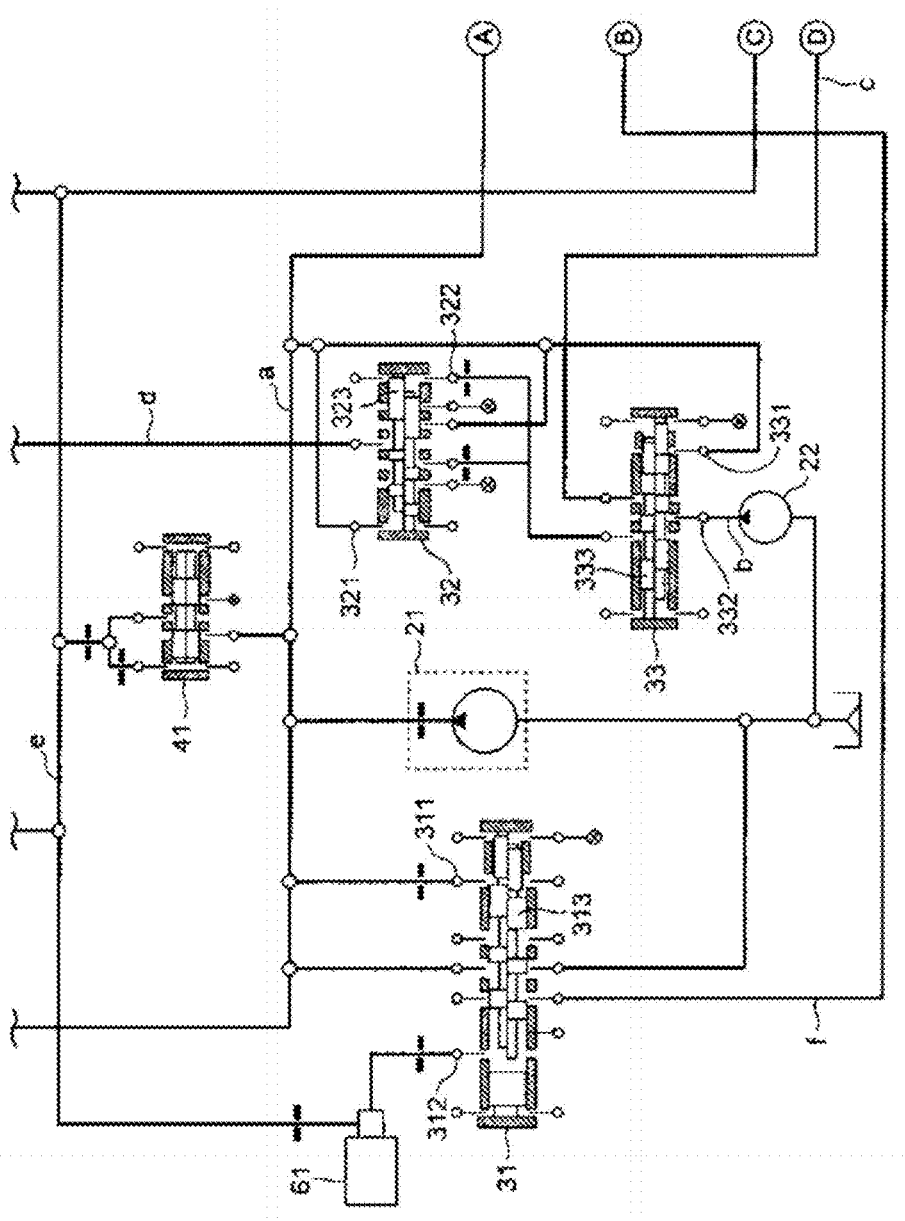
FIG. 4 is a circuit diagram showing a part of a hydraulic control circuit of the automatic transmission according to an embodiment.
Figure 5:
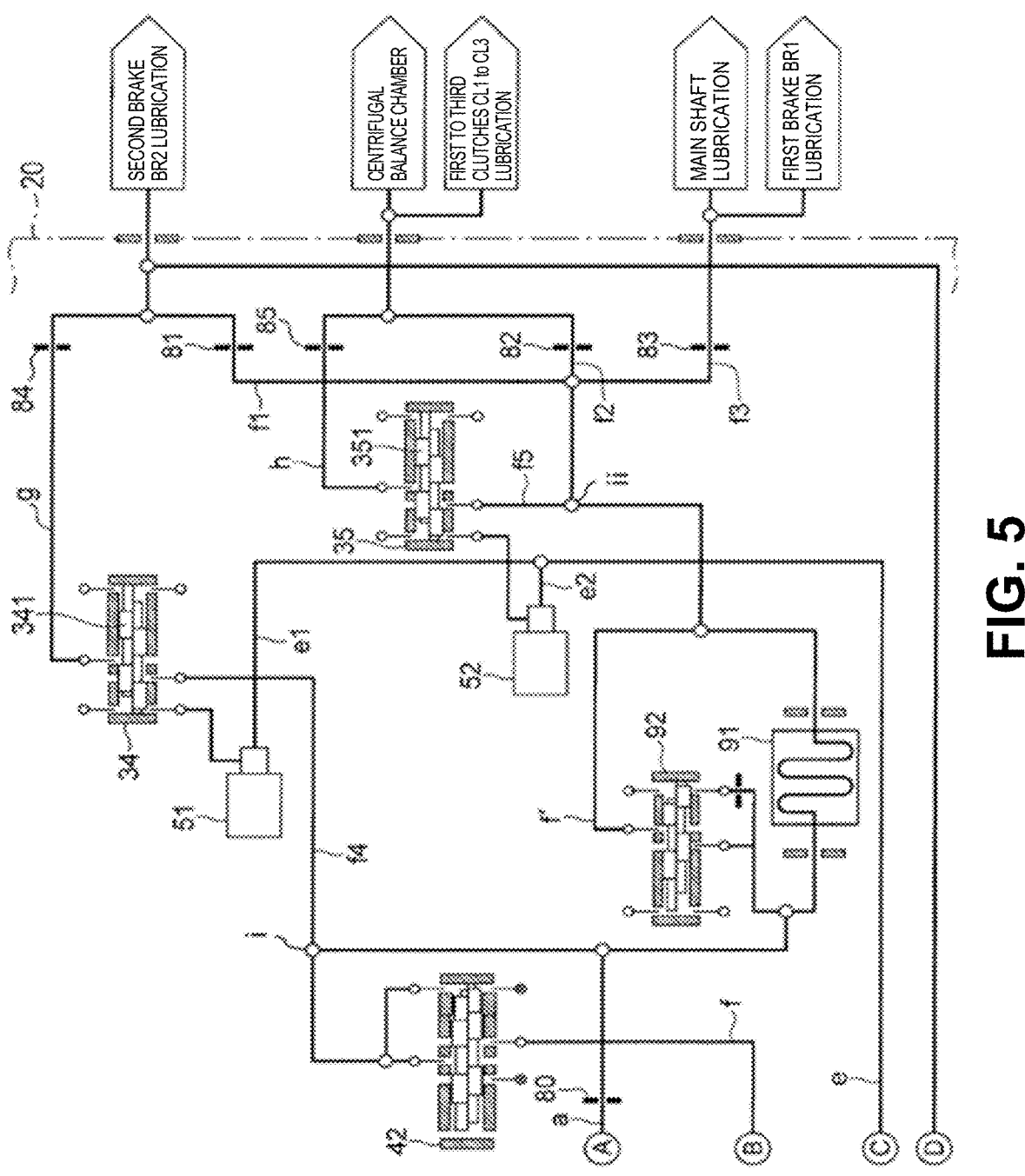
FIG. 5 is a circuit diagram particularly relating to a lubrication circuit in the hydraulic control circuit of the automatic transmission according to an embodiment.

Next, the hydraulic control circuit 20 will be described with reference to FIGS. 4 and 5. FIGS. 4 and 5 are circuit diagrams showing the hydraulic control circuit 20 mainly relating to lubricating oil supply. FIGS. 4 and 5 show the hydraulic control circuit 20, which is one hydraulic circuit, and reference characters A, B, C, and D correspond to each other between the drawings.

The hydraulic control circuit 20 includes a plurality of spool valves that are operated by the hydraulic pressure and a spring force to perform switching of oil passages, adjustment of the hydraulic pressure, and the like, a plurality of on-off solenoid valves (hereinbelow, referred to as the "on-off valves") that are operated by an electric signal to provide communication or interruption between the oil passages, and a plurality of linear solenoid valves (hereinbelow, referred to as the "linear valves") that are also operated by an electric signal to preform supply, discharge, adjustment, and the like of the operating pressure. The hydraulic control circuit 20 is configured to perform gear-shifting control, lubricating oil supply control for controlling the supply of the lubricating oil, and the like, by the hydraulic pressure supply sources, these valves, and the frictional engagement elements being connected through the oil passages.

As shown in FIG. 4, the hydraulic control circuit 20 includes the mechanical oil pump 21, the electrical oil pump 22, a regulator valve 31, a pump shift valve 32, a lubrication switching valve 33, the reducing valve 41, and the line pressure control linear valve 61. In addition, as shown in FIG. 5, the hydraulic control circuit 20 further includes the lubricating oil increasing valve 34 for the second brake, the lubricating oil increasing valve 35 for the first to third clutches, a lubrication reducing valve 42, the first on-off valve 51, the second on-off valve 52, fixed orifices 81, 82, and 83, increasing orifices 84 and 85, an oil cooler 91, and a lubricating oil relief valve 92.

Returning to FIG. 4, the description will be continued. The regulator valve 31 adjusts the discharge pressure of the mechanical oil pump 21 to a predetermined line pressure. The regulator valve 31 includes control ports 311 and 312, and a spool 313. A line pressure oil passage a is connected to the control port 311, and a control pressure oil passage e is connected to the control port 312 through the line pressure control linear valve 61. The spool 313 is configured to have a variable position, a communication destination is changed in accordance with the position of spool 313. When a force caused by the control pressure of the line pressure control linear valve 61 and a spring is smaller than a force caused by the line pressure, the spool 313 is located on the left side on the drawing (the same applies to hereinafter), and the line pressure oil passage a communicates with a main lubrication circuit f. In the opposite case, the spool 313 is located on the right side, and the line pressure oil passage a communicates with a drain port in addition to the main lubrication circuit f.

The pump shift valve 32 performs switching between the line pressure and the discharge pressure of the electrical oil pump 22 and selectively supplies it to the frictional engagement element side as the source pressure of the operating pressure for gear-shifting control. The pump shift valve 32 includes control ports 321 and 322, and a spool 323. The control ports 321 and 322 are located at opposite ends of the pump shift valve 32. The line pressure oil passage a for supplying the line pressure is connected to the control port 321, and a discharge oil passage b of the electrical oil pump 22 is connected to the control port 322 through the lubrication switching valve 33. The spool 323 is configured to have a variable position, and paths to communicate with each other are changed in accordance with the position of the spool 323. When a force caused by the line pressure and a spring is larger than a force caused by the discharge pressure of the electrical oil pump 22, the spool 323 is located on the right side on the drawing (the lower side of the sheet), and the line pressure oil passage a communicates with a gear-shifting source pressure oil passage d. In the opposite case, the spool 323 is located on the left side of the drawing (the upper side of the sheet), and the discharge oil passage b of the electrical oil pump 22 communicates with the gear-shifting source pressure oil passage d.

The lubrication switching valve 33 supplies the discharge oil from the electrical oil pump 22 as the lubricating oil. The lubrication switching valve 33 includes control ports 331 and 332, and a spool 333. The control port 331 is connected to the line pressure oil passage a for supplying the line pressure, and the discharge oil passage b of the electrical oil pump 22 is connected to the control port 332. The spool 333 is configured to have a variable position, and paths to communicate with each other are changed in accordance with the position of the spool 333. When a force caused by the line pressure is larger than a force caused by the discharge pressure of the electrical oil pump 22 and a spring, the spool 333 is located on the left side on the drawing (the lower side of the sheet), and the discharge oil passage b of the electrical oil pump 22 communicates with a lubricating oil adding oil passage c. In the opposite case, the spool 333 is located on the right side on the drawing (the upper side of the sheet), and the discharge oil passage b of the electrical oil pump 22 communicate with the pump shift valve 32 through the lubrication switching valve 33.

The reducing valve 41 is connected to the line pressure oil passage a, and generates a control pressure by the line pressure being reduced to a predetermined pressure, guides the generated control pressure to the line pressure control linear valve 61, and supplies the control pressure to the regulator valve 31. Note that the line pressure control linear valve 61 generates a line pressure adjusting pressure for adjusting the set pressure of the line pressure to a predetermined pressure corresponding to the operating state of the vehicle.

The control pressure generated by the reducing valve 41 is supplied to the first on-off valve 51 and the second on-off valve 52 through a control pressure oil passage e, and first and second branch control pressure oil passages e1 and e2 branching off from the control pressure oil passage e shown in FIG. 5, respectively.

In an implementation, the hydraulic control circuit 20 supplies the gear-shifting control source pressure to the plurality of gear-shifting linear valves 60 each of which generates an engagement pressure for the corresponding one of the first clutch CL1, the second clutch CL2, the second clutch CL3, the first brake BR1, and the second brake BR2, through a plurality of gear-shifting source pressure branch oil passages from the gear-shifting source pressure oil passage d. Then, the engagement pressure generated by each of the linear valves 60 is supplied to the engagement chamber of each frictional engagement element in accordance with the shift stage, and the corresponding frictional engagement element is engaged.

The description of the hydraulic control circuit 20 will be continued with reference to FIG. 5. The first on-off valve 51 takes two states, on or off, and selects the supply destination of the control pressure in accordance with each state. When the first on-off valve 51 is on, the control pressure is supplied to the lubricating oil increasing valve 34 for the second brake through the first branch control pressure oil passage e1. On the other hand, when the first on-off valve 51 is off, the control pressure is not supplied to the lubricating oil increasing valve 34 for the second brake.

The second on-off valve 52 takes two states, on or off, and selects the supply destination of the control pressure in accordance with each state. When the second on-off valve 52 is on, the control pressure is supplied to the lubricating oil increasing valve 35 for the first to third clutches through the second branch control pressure oil passage e2. On the other hand, when the second on-off valve 52 is off, the control pressure is not supplied to the lubricating oil increasing valve 35 for the first to third clutches. The lubricating oil increasing valve 34 for the second brake and the lubricating oil increasing valve 35 for the first to third clutches perform opening and closing operations to switch the amount of lubricating oil supplied by the mechanical oil pump 21 in response to a change in the lubricating oil supply pattern, but the source pressure of the lubricating oil supplied by the mechanical oil pump 21 is constant.

Accordingly, the load of the drive source (engine) used to operate the mechanical oil pump 21 can be made constant, which restrains reduction in fuel efficiency caused by the operating load. Note that, in the present embodiment, the lubricating oil increasing valve 34 for the second brake may be described as the first opening-closing valve, and the lubricating oil increasing valves 35 for the first to third clutches may be described as the second opening-closing valve.

The lubrication reducing valve 42 adjusts the lubricating oil pressure in the main lubrication circuit f. For fail-safe, the line pressure oil passage a is connected, through an orifice 80, to the main lubrication oil passage f connected to the downstream side of the lubrication reducing valve 42. The orifice 80 is, for example, formed with a small diameter of φ0.8 mm, and connects the line pressure oil passage a to the main lubrication circuit f when a pressure difference occurs due to a sudden drop in the lubricating oil pressure in the main lubrication circuit f.

The lubricating oil flowing in the main lubrication circuit f is divided into a first lubrication branch circuit f1, a second lubrication branch circuit f2, and a third lubrication branch circuit f3 after passing through the oil cooler 91. Then, the lubricating oil is supplied to each of the first clutch CL1, the second clutch CL2, the third clutch CL3, the first brake BR1, the second brake BR2, and the main shaft inside the transmission through the fixed orifices 81, 82 and 83.

The main lubrication circuit f is provided with a bypass oil passage f' that bypasses the oil cooler 91, and the bypass oil passage f' is provided with a lubricating oil relief valve 92 for protecting the oil cooler 91.

The main lubrication circuit f branches at a branch point i that is located upstream of the oil cooler 91, and a fourth lubrication branch oil passage f4 is connected to the lubricating oil increasing valve 34 for the second brake. Also, a fifth lubrication branch oil passage f5 branches off from the main lubrication oil passage f at a branch point ii that is located downstream of the oil cooler 91, and the fifth lubrication branch oil passage f5 is connected to the lubricating oil increasing valve 35 for the first to third clutches. The first on-off valve 51, the second on-off valve 52, the lubricating oil increasing valve 34, and the lubricating oil increasing valve 35 operate to increase the amount of lubricating oil described below.

When the first on-off valve 51 is on, due to the control pressure supplied from the first branch control pressure oil passage e1, a spool 341 of the lubricating oil increasing valve 34 for the second brake is located on the right side on the drawing (the upper side of the sheet), and the fourth lubrication branch oil passage f4 communicates with a lubricating oil increasing oil passage g for the second brake. Accordingly, additional lubricating oil is supplied to the second brake BR2 through the lubricating oil increasing valve 34 for the second brake and the increasing orifice 84.

In addition, the lubricating oil increasing oil passage g for the second brake is configured to be capable of supplying the lubricating oil to the second brake BR2 bypassing the oil cooler 91 having high pipeline resistance. Thus, the lubricating oil increasing oil passage g for the second brake can effectively increase the amount of lubricating oil supplied to the second brake BR2 compared to a case in which the lubricating oil is supplied though the oil cooler 91. The presence of the lubricating oil increasing oil passage g for the second brake makes it possible to more effectively cool the second brake BR2 and ensure the durability of the second brake BR2.

Note that, in the present embodiment, a circuit portion including the first lubrication branch oil passage f1 in which the lubricating oil is supplied to the second brake BR2 through the oil cooler 91, and the lubricating oil increasing circuit g for the second brake in which the lubricating oil is supplied to the second brake BR2 bypassing the oil cooler 91 may be described as the first lubrication circuit. In addition, the lubricating oil increasing oil passage g for the second brake may be referred to as the first lubricating oil increasing circuit, and the first lubrication branch oil passage f1 may be referred to as the first main lubrication circuit.

As described above, the first lubrication circuit includes the first lubrication branch oil passage f1 that supplies the lubricating oil to the second brake BR2, and the lubricating oil increasing oil passage g for the second brake branching off from the first lubrication branch circuit f1. That is, the first lubrication circuit supplies the lubricating oil to the second brake BR2, which is the starting frictional engagement element to be engaged when the vehicle starts. The lubricating oil increasing oil passage g for the second brake is provided with the lubricating oil increasing valve 34 for the second brake, and the lubricating oil increasing valve 34 for the second brake is configured to increase the flow rate of the lubricating oil in the first lubrication circuit by being changed from a closed state to an open state. In other words, the lubricating oil increasing valve 34 for the second brake is configured to increase the flow rate of the lubricating oil supplied through the first lubrication branch oil passage f1 and the lubricating oil increasing oil passage g for the second brake by being changed from a closed state to an open state. The first lubrication circuit having such a configuration facilitates supplying more lubricating oil to the second brake BR2 when priority should be given to supplying lubricating oil to the second brake BR2, and the durability of the second brake BR2 can be ensured.

When the second on-off valve 52 is on, due to the control pressure supplied from the second branch control pressure oil passage e2, a spool 351 of the lubricating oil increasing valve 35 for the first to third clutches is located on the right side on the drawing (the upper side of the sheet), and the fifth lubrication branch oil passage f5 communicates with the lubricating oil increasing oil passage h for the first to third clutches. Accordingly, additional lubricating oil is supplied to the first clutch CL1 to the third clutch CL3 through the lubricating oil increasing valve 35 for the first to third clutches and the increasing orifice 85.

Note that, in the present embodiment, a circuit portion including the second lubrication branch oil passage f2 in which the lubricating oil is supplied to the first to third clutches CL1, CL2, CL3 through the oil cooler 91, and the lubricating oil increasing oil passage h for the first clutch CL1, the second clutch CL2, and the third clutch CL3 may be referred to as the second lubrication circuit. In addition, the lubricating oil increasing oil passage h for the first to third clutches may be referred to as the second lubricating oil increasing circuit, and the second lubrication branch oil passage f2 may be referred to as the second main lubrication circuit.

As described above, the second lubrication circuit includes the oil cooler 91 that cools the lubricating oil, and the second lubrication branch oil passage f2 and the lubricating oil increasing oil passage h for the first to third clutches that constitute the second lubrication circuit are configured to supply the lubricating oil to the first clutch CL1 to the third clutch CL3, which are the lubricated portion, through the oil cooler 91. That is, the second lubrication circuit supplies the lubricating oil to the first clutch CL1 to the third clutch CL3, which are the lubricated portion other than the second brake BR2, which is the starting frictional engagement element. The second lubrication circuit functions as the circuit for restraining the temperature rise of the lubricating oil, and, by further providing the oil cooler 91, the lubricating oil temperature rise restraining effect can be further enhanced.

In addition, the second lubrication circuit includes the second lubrication branch oil passage f2 that supplies the lubricating oil to the first clutch CL1 to the third clutch CL3, which are the lubricated portion, and the lubricating oil increasing oil passage h for the first to third clutches branching off from the second lubrication branch circuit f2. The lubricating oil increasing oil passage h for the first to third clutches is provided with the lubricating oil increasing valve 35 for the first to third clutches, and the lubricating oil increasing valve 35 for the first to third clutches is configured to limit the flow rate of the second lubrication circuit by being changed from an open state to a closed state. Accordingly, lubricating oil whose supply is limited by the lubricating oil increasing valve 35 for the first to third clutches is supplied to the second brake BR2, thereby facilitating supplying more lubricating oil to the second brake BR2 to which lubricating oil should be supplied on a priority basis, and the durability of the second brake BR2, which is the starting frictional engagement element, can be ensured.

Furthermore, the hydraulic control circuit 20 is provided with the lubrication switching valve 33 for the electrical oil pump 22 to supply the discharged oil from the electrical oil pump 22 as the lubricating oil for the second brake BR2. The line pressure is supplied as the control pressure to the lubrication switching valve 33 connected to the electrical oil pump 22 from the line pressure oil passage a, and, when the spool 333 is located on the left side due to this control pressure, the discharge oil passage b of the electrical oil pump 22 communicates with the lubricating oil adding oil passage c and is brought to a state connected to the first lubrication circuit. When the electrical oil pump 22 operates in this state, its discharged oil is supplied as the lubricating oil to the second brake BR2 through the lubricating oil adding oil passage c.

Next, the lubricating oil supply patterns that the lubricating oil supply controller 220 refers to will be described with reference to FIG. 6. FIG. 6 is a table showing the lubricating oil supply patterns for the automatic transmission. As shown in FIG. 6, in the table showing the lubricating oil supply patterns, a cooling requirement level, the communicating state of the lubricating oil passage communicating with each frictional engagement element, the amount of lubricating oil supplied to each frictional engagement element, and an assumed scene are set.

The lubricating oil supply patterns are defined differently in accordance with the cooling requirement level for the second brake BR2, and the cooling requirement level for the first to third clutches CL1, CL2, CL3 (e.g., a low cooling requirement level L, a high cooling requirement level H, and a highest cooling requirement level HH). The lubricating oil supply controller 220 determines the lubricating oil pattern by referring to the table in which the lubricating oil supply patterns are set in accordance with the cooling requirement levels for the second brake BR2 and the first clutch CL1 to the third clutch CL3 and performs switching.

The cooling requirement level is determined by determining, for each control cycle, whether a parameter related to the temperature of each frictional engagement element is equal to or higher than a threshold. The parameters used to determine the cooling requirement level and the threshold set for each parameter will be described.

As the parameters for determining the cooling requirement level, parameters based on which it can be determined (estimated) that there is a temperature rise (heat generation) of each frictional engagement element are used. In an implementation, the input torque detected by the input torque sensor 206, the input rotational speed detected by the input rotational speed sensor 203, and the temperature of the second brake BR2 and the temperatures of the first clutch CL1 to the third clutch CL3 calculated by the individual frictional engagement element temperature calculator 230 are used. That is, the cooling requirement level is determined based on the input torque, the input rotational speed, the temperature of the second brake BR2, and the temperatures of the first clutch CL1 to the third clutch CL3.

Since the input torque is in a proportional relationship with the temperature of each frictional engagement element, a temperature rise in each frictional engagement element can be estimated by using the input torque. As the input rotational speed increases, a differential rotation $\Delta N$ increases. Since this differential rotation $\Delta N$ is in a proportional relationship with the temperature of each frictional engagement element, a temperature rise in each frictional engagement element can be estimated by using the input rotational speed as with the input torque.

The communicating state of the lubricating oil passage communicating with each frictional engagement element is the supply destination of the lubricating oil supplied to each frictional engagement element. The communicating state of the lubricating oil passage communicating with each frictional engagement element and the amount of lubricating oil supplied to each frictional engagement element are determined based on the temperature of each frictional engagement element. Note that the temperature of each frictional engagement element is calculated by the individual frictional engagement element temperature calculator 230. The temperature of each frictional engagement element is calculated based on the input rotational speed, the output rotational speed, the input torque, the oil pressure in the oil passage communicating with each frictional engagement element, and a cooling temperature due to heat dissipation of each frictional engagement element to the surrounding atmosphere and the lubricating oil, which will be described further below. The individual frictional engagement element temperature calculator 230 calculates the temperature for each of the first clutch CL1, the second clutch CL2, the third clutch CL3, and the second brake BR2, which are the frictional engagement elements, based on the input rotational speed, the output rotational speed, the input torque, the oil pressure in the oil passage communicating with each frictional engagement element, and the cooling temperature due to heat dissipation of each frictional engagement element to the surrounding atmosphere and the lubricating oil.

A temperature Tl of each frictional engagement element is calculated by the following formula (1), based on T0 calculated in the immediately preceding cycle, an absorbed energy E of each frictional engagement element, a heat capacity Q of the friction plate of each frictional engagement element, and a cooling temperature (Tc×tc) obtained from a heat dissipation rate (frictional engagement element temperature drop rate) Tc from each frictional engagement element to the surrounding atmosphere and the lubricating oil and a cycle time (time required for one calculation) tc. Note that, for each of the frictional engagement elements (the first clutch CL1, the second clutch CL2, the third clutch CL3, and the second brake BR2), the individual frictional engagement element temperature calculator 230 calculates the temperature Tl of each frictional engagement element in each cycle using the temperature T0 of each frictional engagement element calculated in the immediately preceding cycle, the absorbed energy E of each frictional engagement element, the heat capacity Q of the friction plate of each frictional engagement element, the cooling temperature (Tc×tc) obtained from the heat dissipation rate (frictional engagement element temperature drop rate) Tc from each frictional engagement element to the surrounding atmosphere and the lubricating oil and the cycle time (time required for one calculation) tc, and formula (1). In addition, the ATF temperature detected by the oil temperature sensor 205 is used as an initial value of the temperature T0 of each frictional engagement element calculated in the immediately preceding cycle.

[Formula 1]

$$T1 = T0 + E/Q + Tc \times tc \qquad (1)$$

The absorbed energy E of each frictional engagement element is obtained from the differential rotation ΔN between the input side and the output side of each frictional engagement element, a transmission torque Trq of each frictional engagement element, and the following formula (2).

[Formula 2]

$$E = \Delta N \times Trq \qquad (2)$$

The differential rotation ΔN is calculated based on the input rotational speed detected by the input rotational speed sensor 203, the output rotational speed detected by the output rotational speed sensor 204, the shift stage, and a speed diagram. The differential rotation ΔN is calculated from the difference in rotational speed between a drum member and a hub member of the frictional engagement element that is in a disengaged state in the current shift stage and brought into an engaged state in the next shift stage.

The transmission torque Trq is obtained by the following formula (3). In an implementation, the transmission torque Trq is obtained using a friction coefficient μ, the number of friction surfaces n, a clutch effective radius calculated from a friction surface large diameter Do of each frictional engagement element and a friction surface small diameter Di of each frictional engagement element, a piston area calculated from a piston large diameter Dpo and a piston small diameter Dpi, an operating oil pressure Pa detected by the oil pressure sensor 207, and a pressure Pr caused by a piston return spring.

[Formula 3]

$$Trq = \mu n \times \frac{Do^3 - Di^3}{3\left(Do^2 - Di^2\right)} \times \frac{n\left(D_{po}^2 - D_{n\,1}^2\right)}{4}(Pa - Pr) \qquad (3)$$

The temperature drop rate Tc of each frictional engagement element in formula (1) is obtained based on a heat generation temperature ΔT of each frictional engagement element (the temperature of each frictional engagement element–the ATF temperature), and the relationship of the temperature drop rate Tc of each frictional engagement element to the heat generation temperature ΔT of each frictional engagement element. The heat generation temperature ΔT of each frictional engagement element (the temperature of each frictional engagement element–the ATF temperature) is calculated from the temperature T0 of each frictional engagement element (the calculated value calculated in the preceding cycle) and the ATF temperature.

Figure 7:
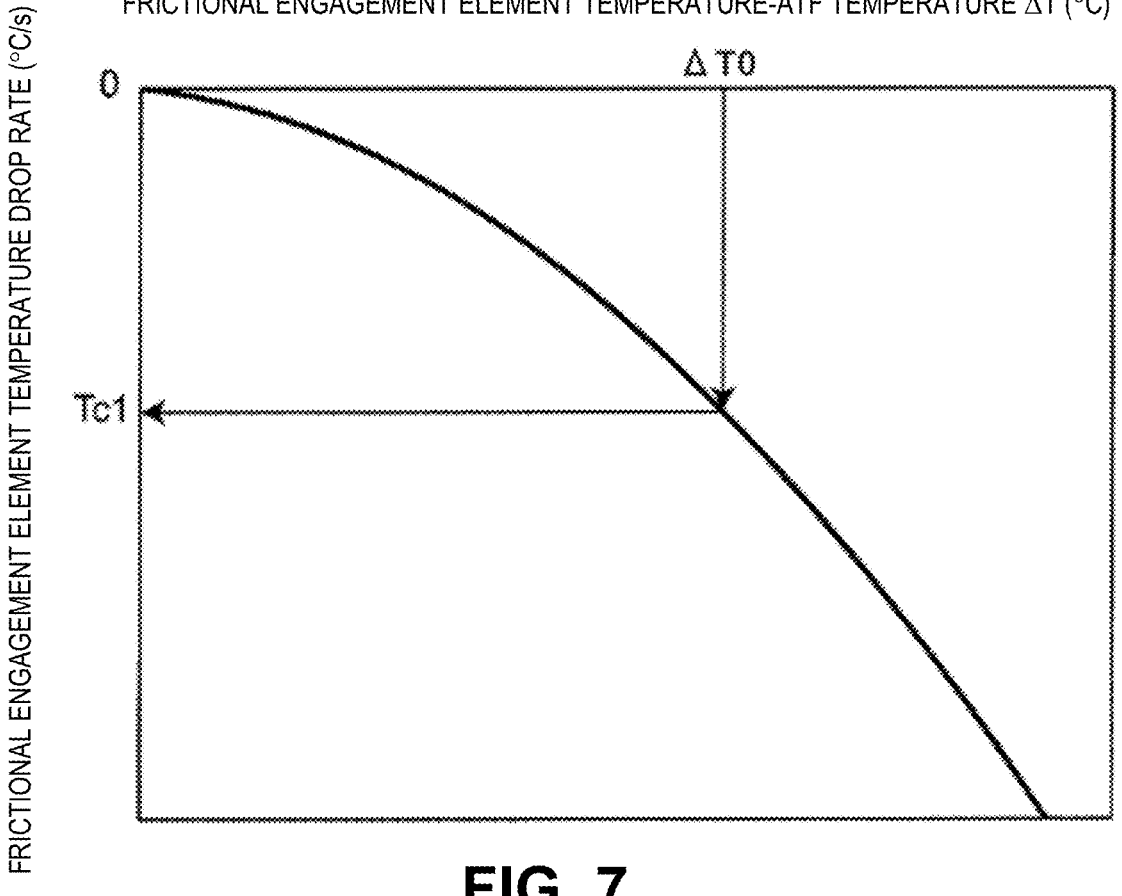
FIG. 7 is a graph showing an example of the cooling characteristics of the temperature of each frictional engagement element in the automatic transmission according to an embodiment.

For the relationship of the temperature drop rate Tc of each frictional engagement element to the heat generation temperature ΔT of each frictional engagement element, a map showing an example of the cooling characteristics of the temperature of each frictional engagement element shown in FIG. 7 is used. For example, when the heat generation temperature of the frictional engagement element is ΔT0, the individual frictional engagement element temperature calculator 230 reads a value of the temperature drop rate Tc1 of the frictional engagement element by referring to the map of FIG. 7 to obtain the temperature drop rate Tc1 of the frictional engagement element.

Here, the map showing the relationship of the temperature drop rate Tc of each frictional engagement element to the heat generation temperature ΔT of each frictional engagement element will be described with reference to FIG. 7. FIG. 7 is the map showing an example of the cooling characteristics of the temperature of each frictional engagement element in the automatic transmission according to an embodiment. This map is calculated by an approximate formula that derives, based on experimental values, the temperature drop rate of a predetermined frictional engagement element to be engaged in a predetermined gear-shifting state when the lubricating oil is supplied at a predetermined flow rate to the predetermined frictional engagement element. Note that the map of the temperature drop rate Tc of each frictional engagement element to the heat generation temperature ΔT of each frictional engagement element is prepared for each of the frictional engagement elements to be engaged in a plurality of gear-shifting states.

Referring back to FIG. 6, the description will be continued. As the thresholds of the above-mentioned parameters (the input torque, the input rotational speed, and the temperature of each frictional engagement element), set values under the condition where the heat generation of each frictional engagement element is relatively low and the lubricating oil needs to be increased are used (set). For example, a threshold Tq1 of the input torque is set at 320 Nm, a threshold Nin of the input rotational speed is set at 3000 rpm, thresholds Tcl1, Tcl2, Tcl3 of the temperatures of the first to third clutches CL1, CL2, CL3 are set at 135° C., and a low temperature threshold Tlow of the temperature of the second brake BR2 is set at 110° C. Note that, for the temperature of the second brake BR2, a medium temperature threshold Tmid higher than the low temperature threshold Tlow, and a high temperature threshold Thigh higher than the medium temperature threshold Tmid are set. For example, the medium temperature threshold Tmid is set at 130° C., and an initial value of the high temperature threshold Thigh is set at 270° C.

As shown in FIG. 6, patterns 1 to 6 are set as the plurality of lubricating oil supply patterns. Here, an example of the plurality of lubricating oil supply patterns, conditions of the parameters for switching each lubricating oil supply pattern, and a scene (the state of the vehicle) assumed in each lubricating oil supply pattern will be described.

The plurality of lubricating oil supply patterns are switched in accordance with the cooling requirement level for the second brake BR2, the cooling requirement level for the first clutch CL1 to the third clutch CL3, the cooling requirement level for the lubricating oil, and a traveling mode of the vehicle set by an occupant's operation or the like. For example, as the cooling requirement level, the low cooling requirement level L that is the cooling requirement level at which the durability can be ensured by cooling each frictional engagement element with the amount of lubricating oil normally supplied to each frictional engagement element, the high cooling requirement level H that is the cooling requirement level higher than the low cooling requirement level L, and the highest cooling requirement level HH that is the cooling requirement level higher than the high cooling requirement level H at the second brake BR2 are set.

When the lubricating oil supply controller 220 determines from a value of each parameter that the cooling requirement level for the second brake BR2 is low L and the cooling requirement level for the first to third clutches CL1, CL2, CL3 is low L, the lubricating oil supply controller 220 executes control of a pattern 1 as a first lubricating oil supply pattern.

The conditions of the parameters are that the temperature of the second brake BR2 is lower than the low temperature threshold Tlow, and all of the parameters for determining the amount of lubricating oil supplied to the first to third clutches CL1, CL2, CL3 (the input torque, the input rotational speed, and the temperatures of the first to third clutches CL1, CL2, CL3) are lower than their respective thresholds Tq1, Nin, Tcl1, Tcl2, Tcl3.

In the pattern 1, the lubricating oil is supplied to the second brake BR2 at a first flow rate (low) through the first lubrication branch oil passage f1. The lubricating oil is supplied to the first to third clutches CL1, CL2, CL3 at a second flow rate (low) through the second lubrication branch oil passage f2.

As the assumed scene, a situation in which the amount of lubricating oil supplied to each frictional engagement element does not need to be increased, such as at light load, during fuel-efficient traveling, coasting-down (for the transmission, during deceleration), and before engine start (for example, at a rotational speed lower than 500 rpm) is assumed. In such a state in which the heat load of each frictional engagement element is not high (the cooling requirement level is low L), the agitation resistance and the drag resistance caused by the lubricating oil of each frictional engagement element and the discharge loss of the oil pumps are reduced by reducing the amount of lubricating oil. Note that, when the lubricating oil supply controller 220 determines from the value of each parameter that the cooling requirement level for the second brake BR2 is low L and the cooling requirement level for the first to third clutches CL1, CL2, CL3 is high H, the lubricating oil supply controller 220 executes control of a pattern 2 as a second lubricating oil supply pattern.

The conditions of the parameters are that the temperature of the second brake BR2 is lower than the low temperature threshold Tlow, and one or more of the parameters for determining the amount of lubricating oil supplied to the first to third clutches CL1, CL2, CL3 (the input torque, the input rotational speed, and the temperatures of the first to third clutches CL1, CL2, CL3) are equal to or higher than predetermined values.

In the pattern 2, the lubricating oil is supplied to the second brake BR2 at the first flow rate (low) through the first lubrication branch oil passage f1. The lubricating oil is supplied to the first to third clutches CL1, CL2, CL3 at a third flow rate (high) higher than the second flow rate through the lubricating oil increasing oil passage h for the first to third clutches in addition to the second lubrication branch oil passage f2.

As the assumed scene, a situation in which the amount of lubricating oil supplied to the second brake BR2 does not need to be increased, and the amount of lubricating oil supplied to the first to third clutches CL1, CL2, CL3 needs to be increased, such as when the ATF temperature is relatively low (e.g., the temperature of the second brake BR2 is not likely to reach the low temperature threshold Tlow), at medium load (e.g., the load is higher than that in an idle state and lower than that during uphill traveling), during acceleration, during upshift, and during downshift due to torque requirement, is assumed.

In an implementation, as shown in FIG. 2, during acceleration, during upshift, and during downshift due to torque requirement (e.g., downshift from the sixth gear to the third gear), and the like, the cooling requirement level for the first to third clutches CL1, CL2, CL3 becomes high because catching of the first to third clutches CL1, CL2, CL3 is changed (the state of switching between a disengaged state and an engaged state).

On the other hand, during acceleration and during upshift, there is no situation in which the second brake BR2 is newly changed to an engaged state, and the temperature of the second brake BR2 thus does not rise.

In addition, during downshift due to torque requirement, although there is an operation of catching the second brake BR2 (changing it from a disengaged state to an engaged state), a temperature rise of the second brake BR2 in this case is lower than a temperature rise of the second brake BR2 in a slipping state of the second brake BR2, and the cooling requirement level for the second brake BR2 is low.

In such a state in which the heat load of the first to third clutches CL1, CL2, CL3 is high and the heat load of the second brake BR2 is not high, the agitation resistance and the drag resistance caused by the lubricating oil in the second brake BR2 and the discharge loss of the oil pumps are reduced by increasing the amount of lubricating oil supplied to the first to third clutches CL1, CL2, CL3 to ensure the durability of the first to third clutches CL1, CL2, CL3 and reducing the amount of lubricating oil supplied to the second brake BR2.

When the lubricating oil supply controller 220 determines from a value of each parameter that the cooling requirement level for the second brake BR2 is high H and the cooling requirement level for the first to third clutches CL1, CL2, CL3 is low L, the lubricating oil supply controller 220 executes control of a pattern 3 as a third lubricating oil supply pattern.

The conditions of the parameters are that the temperature of the second brake BR2 is equal to or higher than the low temperature threshold Tlow, and all of the parameters for determining the amount of lubricating oil supplied to the first to third clutches CL1, CL2, CL3 (the input torque, the input rotational speed, and the temperatures of the first to third clutches CL1, CL2, CL3) are lower than the predetermined values.

In the pattern 3, the lubricating oil is supplied to the second brake BR2 at a fourth flow rate (high) higher than the first flow rate through the lubricating oil increasing circuit g for the second brake in addition to the first lubrication branch oil passage f1. The lubricating oil is supplied to the first to third clutches CL1, CL2, CL3 at the second flow rate (low) that is predetermined through the second lubrication branch oil passage f2.

As the assumed scene, a situation in which the amount of lubricating oil supplied to the second brake BR2 needs to be increased, and the amount of lubricating oil supplied to the first to third clutches CL1, CL2, CL3 does not need to be increased, such as at high load such as during uphill traveling and during traffic congestion.

In an implementation, at downshift when shifting to uphill traveling, the second brake BR2 is controlled in a high-load slip state to ensure torque capacity and smooth traveling. Thus, the temperature of the second brake BR2 is likely to become equal to or higher than the low temperature threshold Tlow, and the cooling requirement level for the second brake BR2 becomes high.

In addition, during traffic congestion, since the frequency of the slip state of the second brake BR2 increases due to the repetition of starting and stopping, the cooling requirement level for the second brake BR2 becomes high.

In such a state in which the cooling requirement level for the second brake BR2 is high, and the cooling requirement level for the first to third clutches CL1, CL2, CL3 is low, the durability of the second brake BR2 is ensured by increasing the amount of lubricating oil supplied to the second brake BR2, and the agitation resistance and the drag resistance in the first to third clutches CL1, CL2, CL3 and the discharge loss of the oil pumps are reduced.

When the lubricating oil supply controller 220 determines from a value of each parameter that the cooling requirement level for the second brake BR2 is high H and the cooling requirement level for the first to third clutches CL1, CL2, CL3 is high H, the lubricating oil supply controller 220 executes control of a pattern 4 as a fourth lubricating oil supply pattern.

The conditions of the parameters are that the temperature of the second brake BR2 is equal to or higher than the low temperature threshold Tlow, and one or more of the parameters for determining the amount of lubricating oil supplied to the first to third clutches CL1, CL2, CL3 (the input torque, the input rotational speed, and the temperatures of the first to third clutches CL1, CL2, CL3) are equal to or higher than the predetermined values.

In the pattern 4, the lubricating oil is supplied to the second brake BR2 at the fourth flow rate (high) higher than the first flow rate through the lubricating oil increasing oil passage g for the second brake in addition to the first lubrication branch oil passage f1. The lubricating oil is supplied to the first to third clutches CL1, CL2, CL3 at the third flow rate (high) higher than the second flow rate through the lubricating oil increasing oil passage h for the first to third clutches in addition to the second lubrication branch oil passage f2.

As the assumed scene, a situation in which the amount of lubricating oil supplied to the second brake BR2 needs to be increased, and the amount of lubricating oil supplied to the first to third clutches CL1, CL2, CL3 also needs to be increased, such as when the ATF temperature is relatively high (e.g., the temperature of the second brake BR2 may reach the low temperature threshold Tlow), at medium load (e.g., the load is higher than that in an idle state and lower than that during uphill traveling), during acceleration, during upshift, and during downshift due to torque requirement, is assumed.

In an implementation, when the ATF temperature is relatively high in the same traveling scene as the pattern 2, the cooling requirement levels for the second brake BR2 and the first to third clutches CL1, CL2, CL3 may become high.

In such a state in which the cooling requirement levels for the second brake BR2 and the first to third clutches CL1, CL2, CL3 are high, priority can be given to the durability of the second brake BR2 and the first to third clutches CL1, CL2, CL3 by increasing the amount of lubricating oil supplied to the second brake BR2 and the first to third clutches CL1, CL2, CL3.

When the lubricating oil supply controller 220 determines from a value of each parameter that the cooling requirement level for the second brake BR2 is highest HH, the lubricating oil supply controller 220 executes control of a pattern 5 as a fifth lubricating oil supply pattern.

The condition of the parameter is that the temperature of the second brake BR2 is equal to or higher than the high temperature threshold Thigh (e.g., 270° C.). Note that, as will be described further below, the high temperature threshold Thigh in the towing mode is changed between values that are set in accordance with the ATF temperature (e.g., 200° C. or 270° C.).

In the pattern 5, the lubricating oil is supplied to the second brake BR2 at a fifth flow rate (extra-high) higher than the fourth flow rate (high) through the lubricating oil adding oil passage c connected to the discharge oil passage b of the electrical oil pump 22 in addition to the first lubrication branch oil passage f1 and the lubricating oil increasing oil passage g for the second brake. The lubricating oil is supplied to the first to third clutches CL1, CL2, CL3 at the second flow rate through the second lubrication branch oil passage f2.

As the assumed scene, a situation in which an excessive heat load is applied to the second brake BR2 at high load such as during accelerator hill hold or towing traveling is assumed.

For example, the accelerator hill hold is a case in which the vehicle is kept in a stopped state on an uphill road using a required driving force from the driver depressing the accelerator pedal without a brake pedal operation.

In the accelerator hill hold, since a braking state is maintained by balancing the sliding-down torque caused by the vehicle's own weight on the uphill road and the required driving torque, a differential rotation occurs between the drive source and driving wheels. This differential rotation causes the second brake BR2 between the drive source and the driving wheels to slip, which applies an excessive heat load to the second brake BR2, thereby making the durability of the second brake BR2 likely to decrease.

In such a situation, the durability of the second brake BR2 is ensured by assigning the highest priority to the cooling of the second brake BR2.

On the other hand, when control that increases the amount of lubricating oil to the second brake BR2 while limiting the amount of lubricating oil to the first to third clutches CL1, CL2, CL3 as in the pattern 5 is continuously performed under the application of an excessive heat load such as during towing, the ratio of lubricating oil passing through the second brake having a high temperature increases, which makes the ATF temperature likely to rise. When the ATF temperature becomes high, leakage from the seal portion due to reduction in the viscosity of the lubricating oil and deterioration in the performance of the component disposed inside the oil pan may be caused.

Thus, in the present embodiment, when the traveling mode of the vehicle is set to the towing mode by the occupant operating the towing mode setter 209, the high temperature threshold Thigh is changed in accordance with the ATF temperature.

In an implementation, the control unit 200 performs control to set the high temperature threshold Thigh to a first threshold Thigh1 (e.g., 200° C.) when the towing mode is set and the ATF temperature is lower than a predetermined temperature Tatf (e.g., 105° C.) and set the high temperature threshold Thigh to a second threshold Thigh2 (e.g., 270° C.) higher than the first threshold Thigh1 when the ATF temperature is equal to or higher than the predetermined temperature Tatf.

In this manner, in a vehicle state in which not only the requirement cooling level for the second brake BR2 but also the cooling requirement level for the lubricating oil is high, the durability of the entire automatic transmission can be ensured by balancing restraining the temperature rise of the second brake BR2 and restraining the temperature rise of the lubricating oil through the above-mentioned control.

When the lubricating oil supply controller 220 determines from a value of each parameter that the cooling requirement level for the second brake BR2 is high H and the cooling requirement level for the lubricating oil is also high H, the lubricating oil supply controller 220 executes control of a pattern 6 as a sixth lubricating oil supply pattern.

The conditions of the parameters are that the towing mode is set by the towing mode setter 209, and the temperature of the second brake BR2 is equal to or higher than the medium temperature threshold Tmid (e.g., 130° C.) and lower than the high temperature threshold Thigh (e.g., 270° C.).

In the pattern 6, the lubricating oil is supplied to the second brake BR2 at a sixth flow rate (high) higher than the first flow rate (low) through the first lubrication branch oil passage f1 and the lubricating oil adding oil passage c connected to the discharge oil passage b of the electrical oil pump 22. The lubricating oil is supplied to the first to third clutches CL1, CL2, CL3 at the third flow rate (high) higher than the second flow rate through the lubricating oil increasing oil passage h for the first to third clutches in addition to the second lubrication branch oil passage f2.

In an implementation, in addition to a state in which the lubricating oil is supplied through the first lubrication branch oil passage f1 using the mechanical oil pump 21 as the hydraulic pressure supply source, by operating the electrical oil pump 22, additional lubricating oil is supplied through the lubricating oil adding oil passage c.

As the assumed scene, a case in which an excessive heat load is applied to the second brake BR2 when the ATF temperature is relatively high and at high load such as during accelerator hill hold or towing traveling is assumed. In an implementation, a situation in which the amount of lubricating oil supplied to the second brake BR2 needs to be increased, and the amount of lubricating oil supplied for restraining the rise of the AFT temperature needs to be increased is assumed.

In this manner, in a state in which the cooling requirement levels for the second brake BR2 and the lubricating oil are high, the durability of the lubricating oil is also ensured while giving priority to ensuring the durability of the second brake BR2.

Note that the first to sixth lubricating oil supply patterns of FIG. 6 and the map shown in FIG. 7 may be previously stored in the storage unit of the control unit 200.

Figure 8:
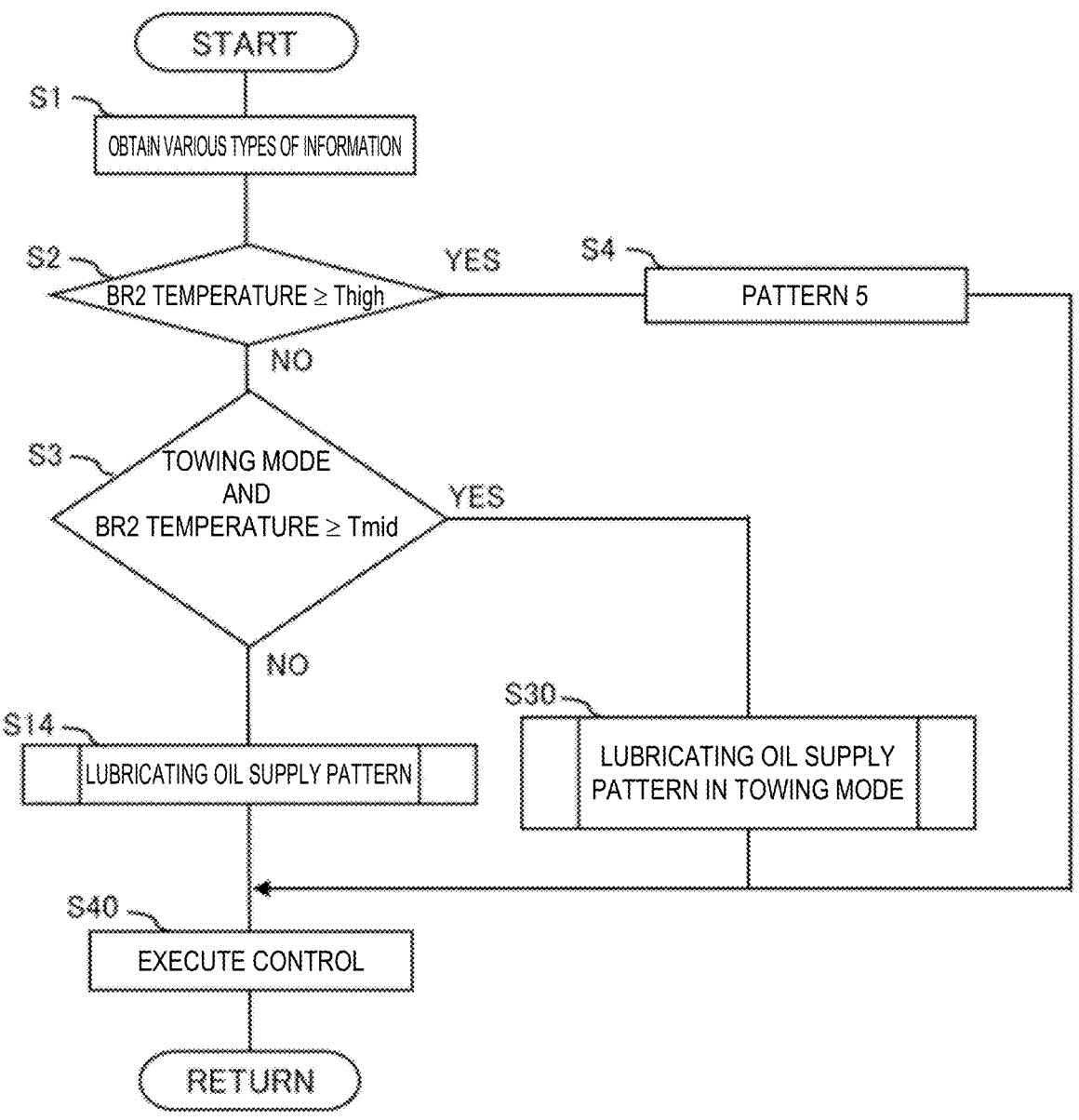
FIG. 8 is a flowchart of lubricating oil supply control for the automatic transmission according to an embodiment.
Figure 9:
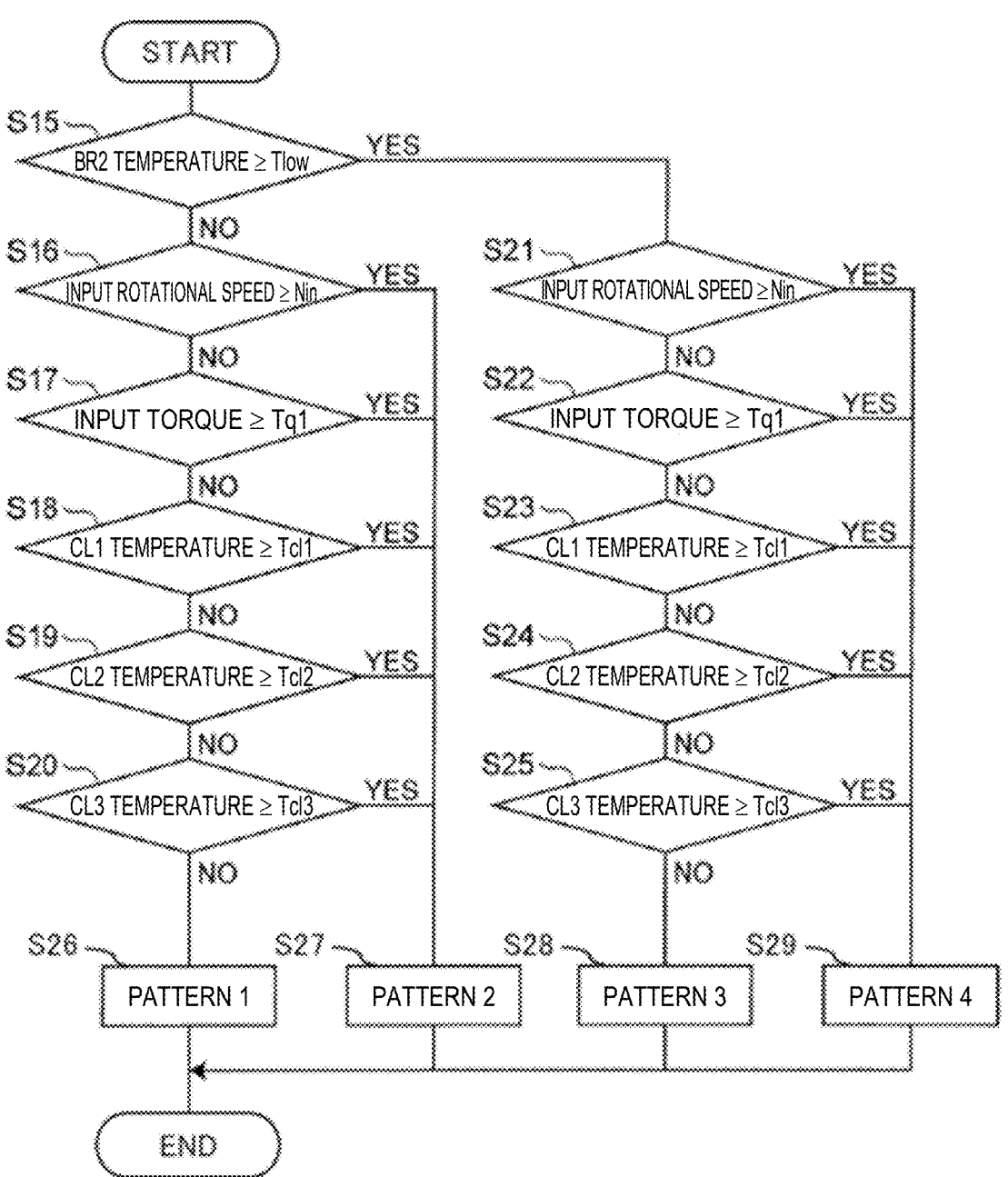
FIG. 9 is a flowchart showing details of a lubricating oil supply pattern determination step in the flowchart of FIG. 8.
Figure 10:
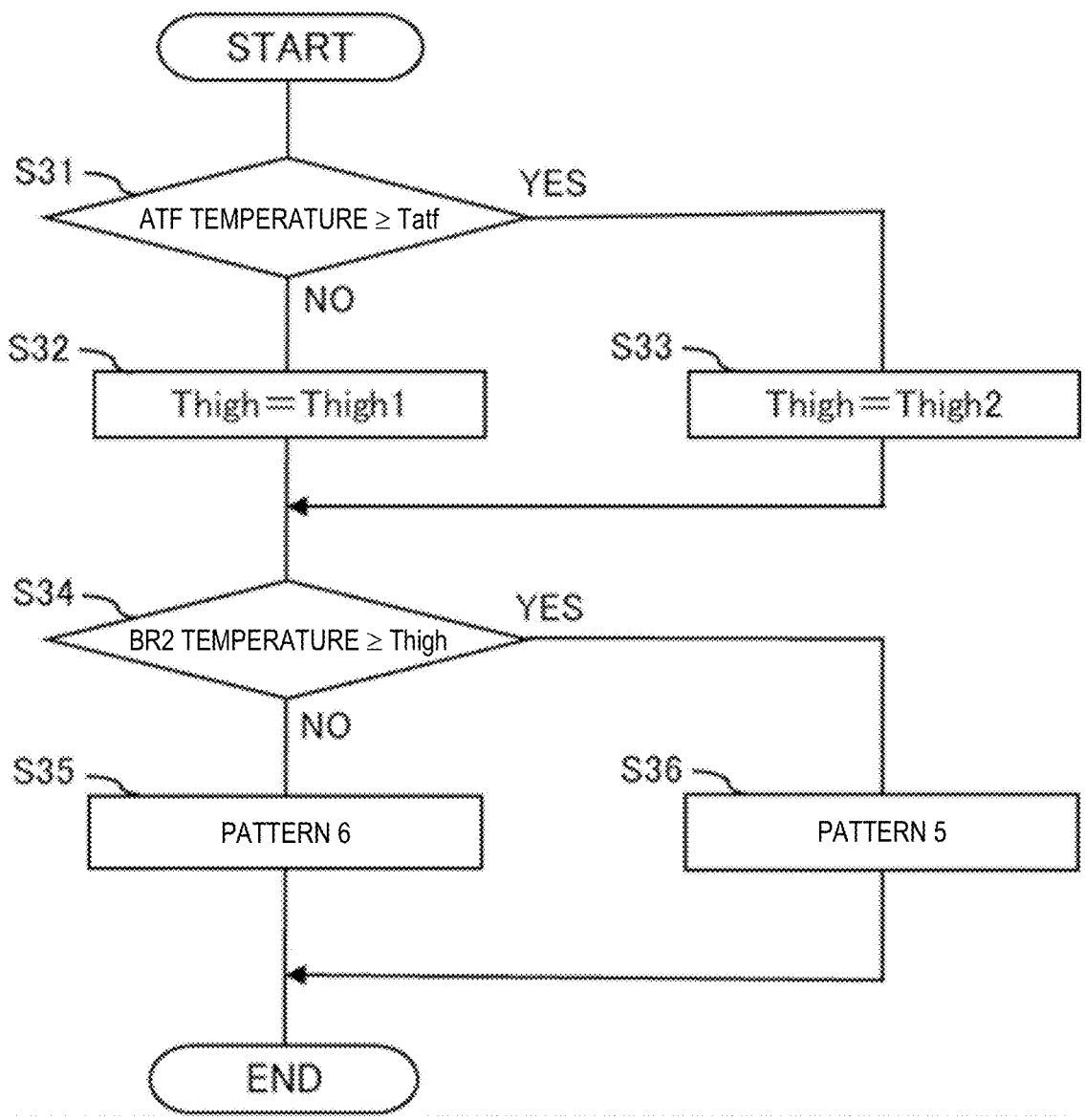
FIG. 10 is a flowchart showing details of the lubricating oil supply pattern determination step in a towing mode in the flowchart of FIG. 8.

Next, an example of the operation of the lubricating oil supply control of the automatic transmission 10 will be specifically described with reference to flowcharts of FIGS. 8 to 10. FIGS. 8 to 10 are diagrams illustrating an example of the lubricating oil supply control of the automatic transmission.

First, the various sensors detect various types of information necessary for the lubricating oil supply control, and the individual frictional engagement element temperature calculator 230 calculates the temperature of each of the frictional engagement elements (the first clutch CL1, the second clutch CL2, the third clutch CL3, and the second brake BR2) using formulae (1) to (3) described above (step S1). In an implementation, the accelerator position sensor 202 detects the accelerator position, the oil temperature sensor 205 detects the oil temperature, the input rotational speed sensor 203 detects the input rotational speed, the output rotational speed sensor 204 detects the output rotational speed, the input torque sensor 206 detects the input torque, and the oil pressure sensor 207 detects the oil pressure. The individual frictional engagement element temperature calculator 230 calculates the temperature of each of the frictional engagement elements (the first clutch CL1, the second clutch CL2, the third clutch CL3, and the second brake BR2) using the accelerator position, the oil temperature, the input rotational speed, the output rotational speed, the input torque, and the oil pressure, and formulae (1) to (3) described above.

Next, the lubricating oil supply controller 220 determines whether the temperature of the second brake (the starting frictional engagement element) BR2 is equal to or higher than the high temperature threshold Thigh (e.g., 270° C.) based on the temperature of the second brake BR2 calculated by the individual frictional engagement element temperature calculator 230 in step S1 (step S2).

When the temperature of the second brake BR2 is equal to or higher than the high temperature threshold Thigh (YES in step S2), the lubricating oil supply controller 220 determines (decides) that the lubricating oil supply pattern is the lubricating oil supply pattern of the pattern 5 (step S4).

When the temperature of the second brake BR2 is lower than the high temperature threshold Thigh (NO in step S2), the lubricating oil supply controller 220 determines whether the vehicle is traveling as the towing mode and the temperature of the second brake BR2 is equal to or higher than the medium temperature threshold Tmid (e.g., 130° C.), based on an input signal from the towing mode setter 209 and the temperature of the second brake BR2 calculated by the individual frictional engagement element temperature calculator 230 (step S3). That is, the lubricating oil supply controller 220 determines whether the vehicle is traveling as the towing mode and the temperature of the starting frictional engagement element is equal to or higher than the medium temperature threshold Tmid.

When the vehicle is traveling as the towing mode and the temperature of the second brake BR2 is equal to or higher than the medium temperature threshold Tmid (YES in step S3), the lubricating oil supply controller 220 executes a lubricating oil supply pattern determination flow in the towing mode shown in FIG. 10 (step S30). In step S30, the lubricating oil supply controller 220 determines (decides) the lubricating oil supply pattern in the towing mode. On the other hand, when the vehicle is not traveling as the towing mode and the temperature of the second brake BR2 is not equal to or higher than the medium temperature threshold Tmid (NO in step S3), the lubricating oil supply controller 220 executes a lubricating oil supply pattern determination flow shown in FIG. 9 (step S14) and determines the lubricating oil supply pattern.

At last, the lubricating oil supply controller 220 determines the supply destination and the supply amount of the lubricating oil in accordance with the lubricating oil supply pattern determined (decided) in steps S4, S14 and S30, and supplies the lubricating oil (step S40).

When the lubricating oil supply controller 220 determines (decides) that the lubricating oil supply pattern is the pattern 1, the lubricating oil supply controller 220 refers to the table shown in FIG. 6 in which the lubricating oil supply patterns are set and performs control such that the lubricating oil is supplied to the second brake BR2 at the first flow rate (low) through the first lubrication branch oil passage f1. In addition, the lubricating oil supply controller 220 performs control such that the lubricating oil is supplied to the first clutch CL1 to the third clutch CL3 at the second flow rate (low) through the second lubrication branch oil passage f2.

When the lubricating oil supply controller 220 determines (decides) that the lubricating oil supply pattern is the pattern 2, the lubricating oil supply controller 220 refers to the table shown in FIG. 6 in which the lubricating oil supply patterns are set and performs control such that the lubricating oil is supplied to the second brake BR2 at the first flow rate (low) through the first lubrication branch oil passage f1. In addition, the lubricating oil supply controller 220 performs control such that the lubricating oil is supplied to the first clutch CL1 to the third clutch CL3 at the third flow rate (high) higher than the second flow rate through the lubricating oil increasing oil passage h for the first to third clutches in addition to the second lubrication branch oil passage f2.

When the lubricating oil supply controller 220 determines (decides) that the lubricating oil supply pattern is the pattern 3, the lubricating oil supply controller 220 refers to the table shown in FIG. 6 in which the lubricating oil supply patterns are set and performs control such that the lubricating oil is supplied to the second brake BR2 at the fourth flow rate (high) higher than the first flow rate through the lubricating oil increasing oil circuit g for the second brake in addition to the first lubrication branch oil passage f1. That is, the lubricating oil supply controller 220 performs control such that the lubricating oil is supplied to the starting frictional engagement element at the fourth flow rate (high) through the first lubricating oil increasing circuit in addition to the first main lubrication circuit. In addition, the lubricating oil supply controller 220 performs control such that the lubricating oil is supplied to the first clutch CL1 to the third clutch CL3 at the second flow rate (low) that is predetermined through the second lubrication branch oil passage f2.

When the lubricating oil supply controller 220 determines (decides) that the lubricating oil supply pattern is the pattern 4, the lubricating oil supply controller 220 refers to the table shown in FIG. 6 in which the lubricating oil supply patterns are set and performs control such that the lubricating oil is supplied to the second brake BR2 at the fourth flow rate (high) higher than the first flow rate through the lubricating oil increasing oil passage g for the second brake in addition to the first lubrication branch oil passage f1. In addition, the lubricating oil supply controller 220 performs control such that the lubricating oil is supplied to the first to third clutches CL1, CL2, CL3 at the third flow rate (high) higher than the second flow rate through the lubricating oil increasing oil passage h for the first to third clutches in addition to the second lubrication branch oil passage f2.

When the lubricating oil supply controller 220 determines (decides) that the lubricating oil supply pattern is the pattern 5, the lubricating oil supply controller 220 refers to the table shown in FIG. 6 in which the lubricating oil supply patterns are set and performs control such that the lubricating oil is supplied to the second brake BR2 at the fifth flow rate (extra-high) higher than the fourth flow rate (high) through the lubricating oil adding oil passage c connected to the discharge oil passage b of the electrical oil pump 22 in addition to the first lubrication branch oil passage f1 and the lubricating oil increasing oil passage g for the second brake. In addition, the lubricating oil supply controller 220 performs control such that the lubricating oil is supplied to the first clutch CL1 to the third clutch CL3 at the second flow rate (low) through the second lubrication branch oil passage f2. That is, when the temperature of the second brake BR2, which is the starting frictional engagement element, is equal to or higher than the high temperature threshold Thigh, the lubricating oil supply controller 220 limits the flow rate of the lubricating oil supplied by the second lubrication circuit including the second lubrication branch oil passage f2 to the lubricated portion. In addition, the lubricating oil supply controller 220 increases the flow rate of the lubricating oil supplied to the starting frictional engagement element through the first lubrication circuit including the first lubrication branch oil passage f1 and the lubricating oil increasing oil passage g for the second brake.

When the lubricating oil supply controller 220 determines (decides) that the lubricating oil supply pattern is the pattern 6, the lubricating oil supply controller 220 refers to the table shown in FIG. 6 in which the lubricating oil supply patterns are set and performs control such that the lubricating oil is supplied to the second brake BR2 at the sixth flow rate (high) higher than the first flow rate (low) through the first lubrication branch oil passage f1 and the lubricating oil adding oil passage c connected to the discharge oil passage b of the electrical oil pump 22. In addition, the lubricating oil supply controller 220 performs control such that the lubricating oil is supplied to the first clutch CL1 to the third clutch CL3 at the third flow rate (high) higher than the second flow rate through the lubricating oil increasing oil passage h for the first to third clutches in addition to the second lubrication branch oil passage f2.

Next, details of step S14 of FIG. 8 will be described with reference to FIG. 9. First, the lubricating oil supply controller 220 determines whether the temperature of the second brake BR2 is equal to or higher than the low temperature threshold Tlow (e.g., 110° C.) (step S15). When the temperature of the second brake BR2 is equal to or higher than the low temperature threshold Tlow (YES in step S15), the lubricating oil supply controller 220 executes step S21. On the other hand, when the temperature of the second brake BR2 is lower than the low temperature threshold Tlow (NO in step S15), the lubricating oil supply controller 220 determines whether the input rotational speed is equal to or higher than a predetermined value Nin (e.g., 3000 rpm) (step S16).

When the input rotational speed is equal to or higher than the predetermined value Nin (e.g., 3000 rpm) (YES in step S16), the lubricating oil supply controller 220 determines that the lubricating oil supply pattern is the pattern 2 (step S27). On the other hand, when the input rotational speed is lower than the predetermined value Nin (NO in step S16), the lubricating oil supply controller 220 determines whether the input torque is equal or higher than a predetermined value Tq1 (e.g., 320 Nm) (step S17).

When the input torque is equal to or higher than the predetermined value Tq1 (YES in step S17), the lubricating oil supply controller 220 determines that the lubricating oil supply pattern is the pattern 2 (step S27). On the other hand, when the input torque is lower than the predetermined value Tq1 (NO in step S17), the lubricating oil supply controller 220 determines whether the temperature of the first clutch CL1 is equal or higher than the predetermined value Tcl1 (e.g., 135° C.) (step S18).

When the temperature of the first clutch CL1 is equal to or higher than the predetermined value Tell (YES in step S18), the lubricating oil supply controller 220 determines that the lubricating oil supply pattern is the pattern 2 (step S27). On the other hand, when the temperature of the first clutch CL1 is lower than the predetermined value Tell (NO in step S18), the lubricating oil supply controller 220 determines whether the temperature of the second clutch CL2 is equal or higher than the predetermined value Tcl2 (e.g., 135° C.) (step S19).

When the temperature of the second clutch CL2 is equal to or higher than the predetermined value Tcl2 (YES in step S19), the lubricating oil supply controller 220 determines that the lubricating oil supply pattern is the pattern 2 (step S27). On the other hand, when the temperature of the second clutch CL2 is lower than the predetermined value Tcl2 (NO in step S19), the lubricating oil supply controller 220 determines whether the temperature of the third clutch CL3 is equal or higher than the predetermined value Tc13 (e.g., 135° C.) (step S20).

When the temperature of the third clutch CL3 is equal to or higher than the predetermined value Tcl3 (YES in step S20), the lubricating oil supply controller 220 determines that the lubricating oil supply pattern is the pattern 1 (step S26). On the other hand, when the temperature of third clutch CL3 is lower than the predetermined value Tcl3 (NO in step S20), the lubricating oil supply controller 220 determines that the lubricating oil supply pattern is the pattern 2 (step S27).

That is, when the temperature of the second brake BR2 is lower than the low temperature threshold Tlow, the input rotational speed is lower than the predetermined value Nin, the input torque is lower than the predetermined value Tq1, and the first to third clutches CL1, CL2, CL3 are lower than the predetermined values Tcl1, Tcl2, Tcl3 (NO in all of step S15 to step S20), the lubricating oil supply controller 220 determines (decides) that the lubricating oil supply pattern is the pattern 1. On the other hand, when the temperature of the second brake BR2 is lower than the low temperature threshold Tlow, and any one of the input rotational speed, the input torque, and the temperatures of the first to third clutches CL1, CL2, CL3 is equal to or higher than the predetermined value (NO in step S15 and YES in any one of step S16 to step S20), the lubricating oil supply controller 220 determines (decides) that the lubricating oil supply pattern is the pattern 2.

Returning to FIG. 9, the description will be continued. When the temperature of the second brake BR2 is equal to or higher than the low temperature threshold Tlow (YES in step S15), the lubricating oil supply controller 220 determines whether the input rotational speed is equal to or higher than the predetermined value Nin (e.g., 3000 rpm) (step S21). When the input rotational speed is equal to or higher than the predetermined value Nin (YES in step S21), the lubricating oil supply controller 220 determines (decides) that the lubricating oil supply pattern is the pattern 4 (step S29). On the other hand, when the input rotational speed is lower than the predetermined value Nin (NO in step S21), the lubricating oil supply controller 220 determines whether the input torque is equal to or higher than the predetermined value Tq1 (e.g., 320 Nm) (step S22).

When the input torque is equal to or higher than the predetermined value Tq1 (YES in step S22), the lubricating oil supply controller 220 determines (decides) that the lubricating oil supply pattern is the pattern 4 (step S29). On the other hand, when the input torque is lower than the predetermined value Tq1 (NO in step S22), the lubricating oil supply controller 220 determines whether the temperature of the first clutch CL1 is equal or higher than the predetermined value Tcl1 (e.g., 135° C.) (step S23). When the temperature of the first clutch CL1 is equal to or higher than the predetermined value Tell (YES in step S23), the lubricating oil supply controller 220 determines (decides) that the lubricating oil supply pattern is the pattern 4 (step S29). On the other hand, when the temperature of the first clutch CL1 is lower than the predetermined value Tcl1 (NO in step S23), the lubricating oil supply controller 220 determines whether the temperature of the second clutch CL2 is equal or higher than the predetermined value Tcl2 (e.g., 135° C.) (step S24).

When the temperature of the second clutch CL2 is equal to or higher than the predetermined value Tcl2 (YES in step S24), the lubricating oil supply controller 220 determines (decides) that the lubricating oil supply pattern is the pattern 4 (step S29). On the other hand, when the temperature of the second clutch CL2 is lower than the predetermined value Tcl2 (NO in step S24), the lubricating oil supply controller 220 determines whether the temperature of the third clutch CL3 is equal or higher than the predetermined value Tcl3 (e.g., 135° C.) (step S25).

When the temperature of the third clutch CL3 is equal to or higher than the predetermined value Tcl3 (YES in step S25), the lubricating oil supply controller 220 determines (decides) that the lubricating oil supply pattern is the pattern 4 (step S29). On the other hand, when the temperature of the third clutch CL3 is lower than the predetermined value Tcl3 (NO in step S25), the lubricating oil supply controller 220 determines (decides) that the lubricating oil supply pattern is the pattern 4 (step S28).

That is, when the temperature of the second brake BR2 is equal to or higher than the threshold Tlow, the input rotational speed is lower than the predetermined value Nin, the input torque is lower than the predetermined value Tq1, and the first to third clutches CL1, CL2, CL3 are lower than the predetermined values Tcl1, Tcl2, Tcl3 (YES in step S15 and NO in all of step S16 to step S20), the lubricating oil supply controller 220 determines (decides) that the lubricating oil supply pattern is the pattern 3.

On the other hand, when the temperature of the second brake BR2 is equal to or higher than the low temperature threshold Tlow, and any one of the input rotational speed, the input torque, and the temperatures of the first clutch CL1 to the third clutch CL3 is equal to or higher than the predetermined value (YES in step S15 and YES in any one of step S16 to step S20), the lubricating oil supply controller 220 determines (decides) that the lubricating oil supply pattern is the pattern 4.

Next, details of step S30 will be described with reference to FIG. 10. FIG. 10 is an example of the operation of determining the lubricating oil supply pattern in the towing mode.

The lubricating oil supply controller 220 determines whether the ATF temperature is equal to or higher than the predetermined temperature Tatf (e.g., 105° C.) (step S31). When the ATF temperature is lower than the predetermined temperature Tatf (NO in step S31), the lubricating oil supply controller 220 sets the high temperature threshold Thigh to the first threshold Thigh1 (e.g., 200° C.) (step S32). On the other hand, when the ATF temperature is equal to or higher than the predetermined temperature Tatf (YES in step S31), the lubricating oil supply controller 220 sets the high temperature threshold Thigh to the second threshold Thigh2 (e.g., 270° C.) higher than the first threshold Thigh1 (step S33). That is, the lubricating oil supply controller 220 changes the high temperature threshold Thigh in accordance with the ATF temperature, which is the temperature of the lubricating oil. In other words, the lubricating oil supply controller 220 performs control such that the high temperature threshold Thigh increases as the ATF temperature increases.

Next, the lubricating oil supply controller 220 determines whether the temperature of the second brake BR2 is equal to or higher than the high temperature threshold Thigh (step S34). That is, the lubricating oil supply controller 220 determines whether the temperature of the second brake BR2, which is the starting frictional engagement element, is equal to or higher than the high temperature threshold Thigh.

When the temperature of the second brake BR2 is equal to or higher than the high temperature threshold Thigh (YES in step S34), the lubricating oil supply controller 220 determines (decides) that the lubricating oil supply pattern is the pattern 5 (step S36).

On the other hand, when the temperature of the second brake BR2 is lower than the high temperature threshold Thigh (NO in step S34), the lubricating oil supply controller 220 determines (decides) that the lubricating oil supply pattern is the pattern 6 (step S35).

Figure 11:
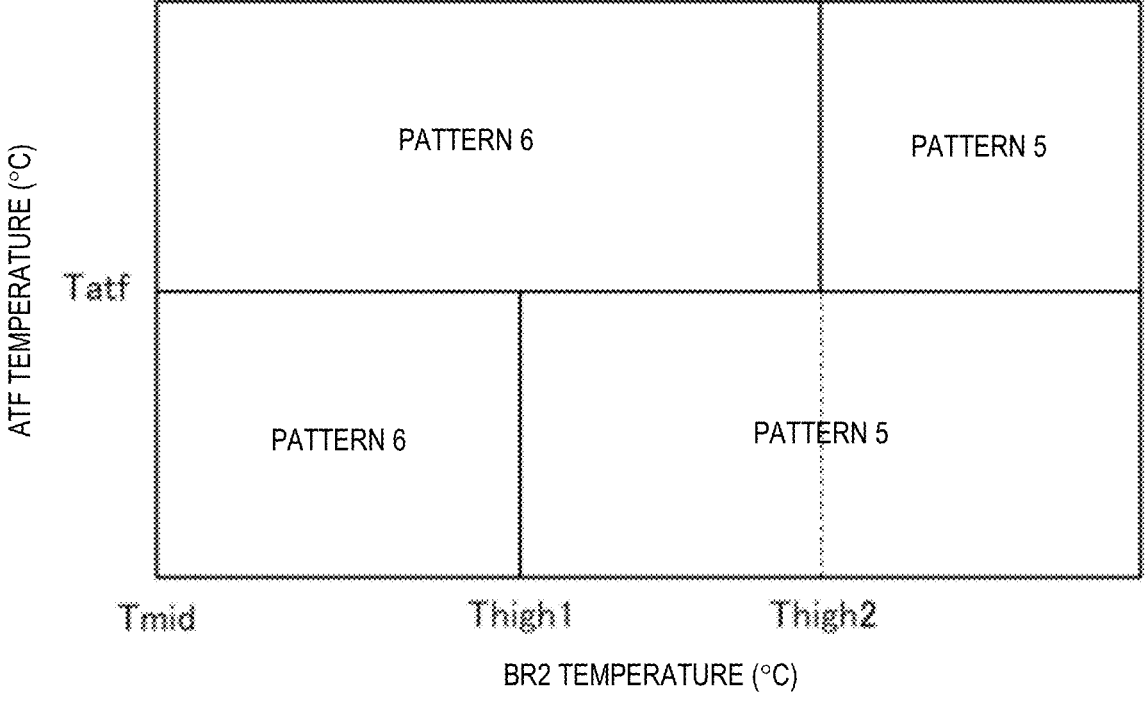
FIG. 11 is a map showing an example of the details of the lubricating oil supply pattern determination step in the flowchart of FIG. 10.

Here, the lubricating oil supply pattern in the towing mode determined by the lubricating oil supply controller 220 will be described in accordance with the operation example of FIG. 10 with reference to FIG. 11. FIG. 11 is a map showing an example of the details of the lubricating oil supply pattern determination step in the flowchart of FIG. 10. As shown in FIG. 11, when the ATF temperature is lower than the predetermined temperature Tatf and the temperature of the second brake BR2, which is the starting frictional engagement element, is equal to or higher than the first threshold Thigh1, the lubricating oil supply controller 220 determines (decides) that the lubricating oil supply pattern is the pattern 5. In addition, when the ATF temperature is equal to or higher than the predetermined temperature Tatf and the temperature of the second brake BR2, which is the starting frictional engagement element, is equal to or higher than the second threshold Thigh2, the lubricating oil supply controller 220 determines (decides) that the lubricating oil supply pattern is the pattern 5.

Here, as shown in FIGS. 4 and 5, the electrical oil pump 22 is connected to the first lubrication circuit. In other words, the electrical oil pump 22 is connected to the first lubrication branch circuit f1 and the lubricating oil increasing oil passage g for the second brake. In particular, in the towing mode and when the temperature of the second brake BR2 is equal to or higher than the medium temperature threshold Tmid, in addition to the lubricating oil supplied from the mechanical oil pump 21 through the first lubrication branch oil passage f1 and the lubricating oil increasing oil passage g for the second brake, the lubricating oil is supplied to the second brake BR2 also from the electrical oil pump 22 through the lubricating oil adding oil passage c. This makes it possible to appropriately cool the second brake BR2, and the durability of the second brake BR2 can thus be ensured.

In addition, when the ATF temperature is lower than the predetermined temperature Tatf and the temperature of the second brake BR2, which is the starting frictional engagement element, is equal to or higher than the medium temperature threshold Tmid and lower than the first threshold Thigh1, the lubricating oil supply controller 220 determines (decides) that the lubricating oil supply pattern is the pattern 6. When the ATF temperature is equal to or higher than the predetermined temperature Tatf and the temperature of the second brake BR2, which is the starting frictional engagement element, is equal to or higher than the medium temperature threshold Tmid and lower than the second threshold Thigh2, the lubricating oil supply controller 220 determines (decides) that the lubricating oil supply pattern is the pattern 6.

As described above, according to the automatic transmission 10 according to the present embodiment, the hydraulic control apparatus 2 switches the lubricating oil supply pattern in accordance with the temperature of the second brake BR2, the input torque, the input rotational speed, and the temperatures of the first clutch CL1 to the third clutch CL3. That is, by using the hydraulic control apparatus 2, it is possible to supply an appropriate amount of lubricating oil to the second brake BR2 and the first clutch CL1 to the third clutch CL3 in accordance with the state of the vehicle. Thus, by using the automatic transmission 10 including the hydraulic control apparatus 2, it is possible to supply a required amount of lubricating oil to each of the second brake BR2 and the first clutch CL1 to the third clutch CL3 as needed while reducing the amount of lubricating oil supplied to the second brake BR2 and the first clutch CL1 to the third clutch CL3 placing a premium on fuel efficiency at normal times. Thus, according to the automatic transmission 10 including the hydraulic control apparatus 2, it is possible to achieve both improving the fuel efficiency in the entire transmission and ensuring durability based on the temperature of each frictional engagement element and the lubricating oil, taking into consideration the state of the vehicle.

In addition, since the hydraulic control apparatus 2 switches the amount of lubricating oil to the second brake BR2, which is severe against heat generation, using the temperature of the second brake BR2, which is a parameter more directly related to the heat load, the amount of lubricating oil supplied can be appropriately set.

Furthermore, the hydraulic control apparatus 2 changes the high temperature threshold Thigh for the second brake BR2 in accordance with the ATF temperature, and changes the lubricating oil supply pattern in accordance with the relationship between the temperature of the second brake BR2 and the high temperature threshold Thigh. In an implementation, when the towing mode is set by the towing mode setter 209, the hydraulic control apparatus 2 performs control to change the high temperature threshold Thigh in accordance with the temperature of the lubricating oil detected by the oil temperature sensor 205. Accordingly, the hydraulic control apparatus 2 can achieve both restraining the temperature rise of the second brake BR2 and restraining the rise of the ATF temperature, and ensure the durability of the starting frictional engagement element and an internal component affected by the lubricating oil temperature.

In addition, when the temperature of the lubricating oil is high, the hydraulic control apparatus 2 performs control to set the high temperature threshold Thigh for the second brake BR2 to the second threshold Thigh2 higher than the first threshold Thigh1, thereby narrowing the temperature range in which the pattern 5 is selected and widening the temperature range in which the pattern 6 is selected compared to when the temperature of the lubricating oil is medium or low. In other words, when the temperature of the lubricating oil is equal to or higher than the predetermined temperature Tatf, the hydraulic control apparatus 2 sets the high temperature threshold Thigh for the second brake BR2 to the second threshold Thigh2 higher than the first threshold Thigh1 so that the pattern 6 for restraining the temperature rise of the lubricating oil is more likely to be selected than when the temperature of the lubricating oil is lower than the predetermined temperature Tatf.

On the other hand, when the temperature of the lubricating oil is medium or low, the hydraulic control apparatus 2 performs control to set the high temperature threshold Thigh for the second brake BR2 to the first threshold Thigh1, thereby narrowing the temperature range in which the pattern 6 is selected and widening the temperature range in which the pattern 5 is selected compared to when the temperature of the lubricating oil is medium or low. In other words, when the temperature of the lubricating oil is lower than the predetermined temperature Tatf, the hydraulic control apparatus 2 sets the high temperature threshold Thigh for the second brake BR2 to the first threshold Thigh1 so that the pattern 5 for restraining the temperature rise of the second brake BR2 is more likely to be selected than when the temperature of the lubricating oil is equal to or higher than the predetermined temperature Tatf. In addition, by setting the high temperature threshold Thigh to any one of the two thresholds: the first threshold Thigh1 and the second threshold Thigh2, the hydraulic control apparatus 2 can efficiently restrain temperature rises of both the second brake BR2 and the lubricating oil without making the control complicated. Thus, according to the hydraulic control apparatus 2, it is possible to efficiently restrain temperature rises of both the second brake BR2 and the lubricating oil and ensure the durability of the second brake BR2 and the lubricating oil.

Although the embodiment has been described above, the embodiments are not limited to the illustrative embodiment, and various changes may be made without departing from the gist of the application. For example, the present embodiment may be modified as follows.
<Modifications>

Although, in the embodiment described above, the hydraulic control apparatus 2 performs control to change the high temperature threshold Thigh in accordance with the ATF temperature only when the towing mode is set, the control to change the high temperature threshold Thigh in accordance with the ATF temperature may be performed regardless of the presence or absence of setting of the towing mode. For example, before step S2 or in step S2 of FIG. 8, the traveling state of accelerator hill hold may be detected by the various sensors, and control to change the high temperature threshold Thigh in accordance with this traveling state may be performed.

In addition, although, in the present embodiment, when the ATF temperature is equal to or higher than the predetermined temperature Tatf (e.g., 105° C.), the hydraulic control apparatus 2 performs change between the two thresholds, that is, from the first threshold Thigh1 (e.g., 200° C.) to the second threshold Thigh2 (e.g., 270° C.), the number of thresholds to be used is not limited to two. For example, the hydraulic control apparatus 2 may determine the high temperature threshold Thigh based on a function that calculates the high temperature threshold Thigh in accordance with the ATF temperature. This function may be, for example, a linear function in which, as the ATF temperature increases, the high temperature threshold Thigh also increases, or it may be a higher-order or nonlinear function.

Although, in the present embodiment, the configuration including the mechanical oil pump 21 that is driven by the engine and the electrical oil pump 22 that is driven by electricity as the hydraulic pressure supply sources has been described, the mechanical oil pump 21 may be replaced with the electrical oil pump 22 to employ a configuration including only the electrical oil pumps 22.

In addition, in the present embodiment, the hydraulic control apparatus 2 determines the lubricating oil supply pattern in accordance with whether the temperature of the second brake BR2, the input rotational speed, the input torque, and the temperatures of the first clutch CL1 to the third clutch CL3 are equal to or higher than the predetermined thresholds. However, the hydraulic control apparatus 2 may determine the lubricating oil supply pattern based on the input torque and the temperature of the second brake BR2. Alternatively, the hydraulic control apparatus 2 may determine the lubricating oil supply pattern based on the input torque, the input rotational speed or the temperatures of the first clutch CL1 to the third clutch CL3, and the temperature of the second brake BR2.

Figure 12:
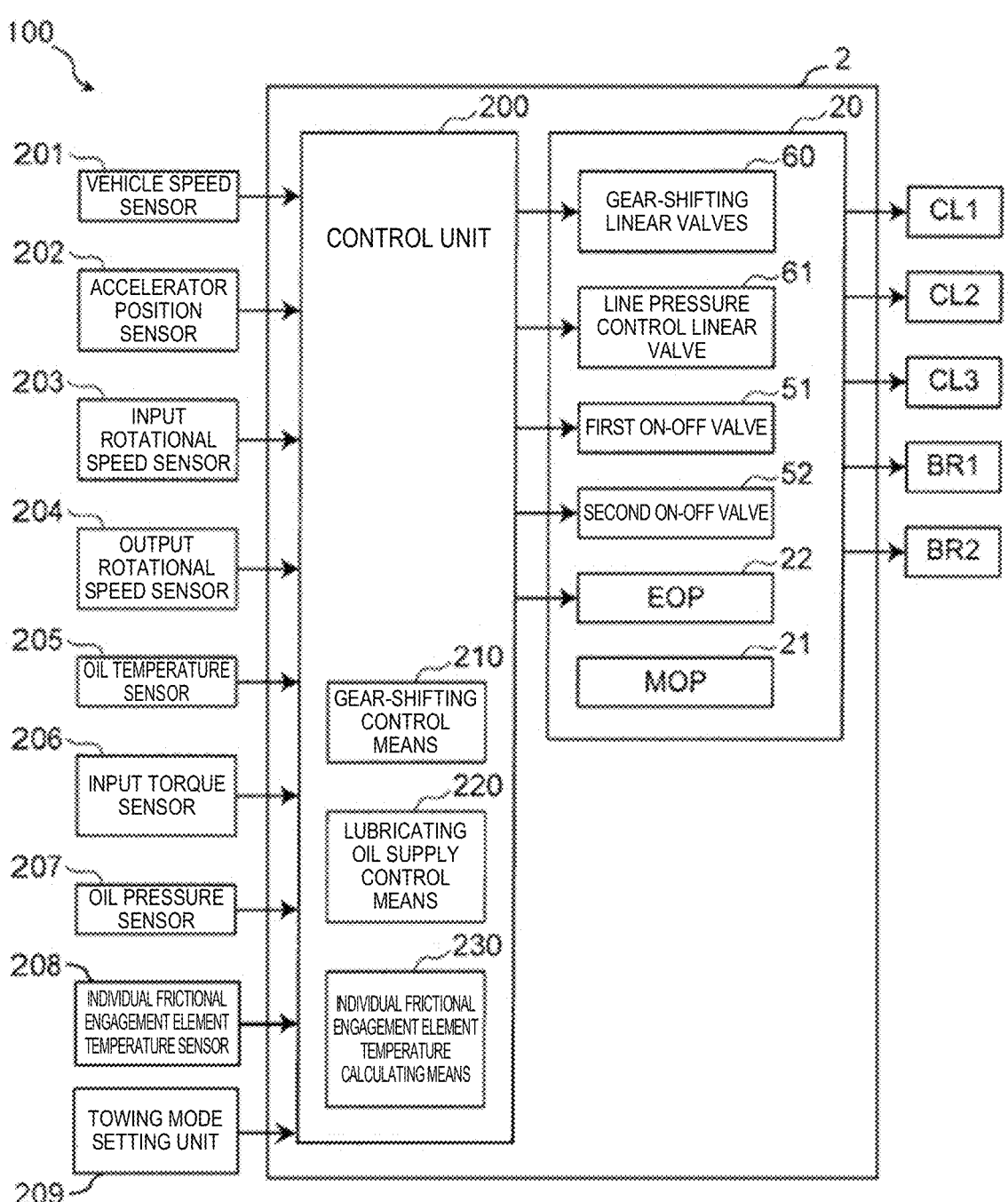
FIG. 12 is a diagram showing a configuration example of an automatic transmission according to a modification.

In addition, although, in the present embodiment, the hydraulic control apparatus 2 calculates the temperature of each frictional engagement element through the calculation based on detected values of the various sensors, the automatic transmission 10 may include a temperature sensor that detects the temperature of each frictional engagement element, and the temperature sensor may directly detect the temperature. FIG. 12 is a configuration example of an automatic transmission according to a modification. As shown in FIG. 12, an automatic transmission 100 further includes an individual friction element temperature sensor 208 in addition to the configuration of the automatic transmission 10. The individual friction element temperature sensor 208 may detect the temperature of each of the frictional engagement elements (the first clutch CL1 to the third clutch CL3, the first brake BR1 and the second brake BR2). In addition, the lubricating oil supply controller 220 may perform control using the temperature detected by the individual friction element temperature sensor 208.

In addition, although, in the embodiment described above, the automatic transmission 10 includes the increasing orifices 84 and 85, the lubricating oil increasing valves 34 and 35, and the fixed orifices 81, 82, and 83 as the increasing circuit for each frictional engagement element to increase the amount of lubricating oil supplied to each frictional engagement element, a variable orifice may be used instead of these, and the orifice diameter may be adjusted in accordance with the operating state of the vehicle. Such a modification enables the automatic transmission 10 to adjust the flow rate in the first lubrication circuit and the second lubrication circuit.

In addition, although, in the embodiment described above, the lubricating oil supply controller 220 determines the lubricating oil supply pattern based on the flowchart shown in FIG. 10 when the towing mode is set, the lubricating oil supply pattern may be determined based on the map shown in FIG. 11. In this case, the control unit 200 previously stores the determination map shown in FIG. 11 using the thresholds Thigh1, Thigh2 for the temperature of the second brake BR2 and the predetermined temperature Tatf for the ATF temperature in a storage unit. In addition, the lubricating oil supply controller 220 may determine the lubricating oil supply pattern by referring to the map shown in FIG. 11.

In addition, in the embodiment described above, the lubricating oil supply controller 220 executes step S14 or S30 by comparing the input signal from the towing mode setter 209 and the temperature of the second brake BR2 calculated by the individual frictional engagement element temperature calculator 230 in step S3 shown in FIG. 8. However, this is not a limitation, and the lubricating oil supply controller 220 may execute step S30 when the lubricating oil supply controller 220 determines that the towing mode is set based on the input signal from the towing mode setter 209 in step S3.

INDUSTRIAL APPLICABILITY

As described above, according to an embodiment, in the control apparatus for the automatic transmission, since it is possible not only to ensure the durability of the starting frictional engagement element, but also to ensure the durability of the entire automatic transmission including the internal component affected by the temperature of the lubricating oil by also restraining the temperature rise of the lubricating oil, while restraining deterioration in fuel efficiency, the embodiment may be suitably used in the automatic transmission manufacturing field.

REFERENCE SIGNS LIST

2 hydraulic control apparatus (lubrication control apparatus)
10 automatic transmission
20 hydraulic control circuit
21 mechanical oil pump
22 electrical oil pump
34 lubricating oil increasing valve for second brake (first opening-closing valve)
35 lubricating oil increasing valve for first to third clutches (second opening-closing valve)
91 oil cooler
200 controller
230 individual frictional engagement element temperature calculator
BR2 second brake (starting frictional engagement element)
CL1 to CL3 first clutch to third clutch (lubricated portion)
f1, g first lubrication circuit f1 first lubrication branch oil passage (first main lubrication circuit)
g lubricating oil increasing oil passage for second brake (first lubricating oil increasing circuit)
f2, h second lubrication circuit
f2 second lubrication branch oil passage (second main lubrication circuit)
h lubricating oil increasing oil passage for first to third clutches (second lubricating oil increasing circuit)

The invention claimed is:

1. A lubrication control apparatus that controls lubricating oil of an automatic transmission, comprising:
   a first lubrication circuit that supplies the lubricating oil to a starting frictional engagement element to be engaged when a vehicle starts;
   a second lubrication circuit that supplies the lubricating oil to a lubricated portion other than the starting frictional engagement element; and
   a controller that increases a flow rate of the lubricating oil supplied by the first lubrication circuit while limiting a flow rate of the lubricating oil supplied by the second lubrication circuit when a temperature of the starting frictional engagement element is equal to or higher than a threshold temperature,
   wherein the controller changes the threshold temperature in accordance with a temperature of the lubricating oil.

2. The lubrication control apparatus according to claim 1, wherein, when the threshold temperature in a case where the temperature of the lubricating oil is lower than a predetermined temperature is defined as a first threshold temperature, the controller performs control to set the threshold in a case where the temperature of the lubricating oil is equal to or higher than the predetermined temperature to a second threshold temperature higher than the first threshold temperature.

3. The lubrication control apparatus according to claim 2, further comprising an oil cooler that cools the lubricating oil, wherein the second lubrication circuit supplies the lubricating oil to the lubricated portion through the oil cooler.

4. The lubrication control apparatus according to claim 3, further comprising a first oil supplier connected to the first lubrication circuit and the second lubrication circuit, wherein a source pressure of the lubricating oil supplied by the first oil supplier is constant.

5. The lubrication control apparatus according to claim 4, further comprising second oil supplier connected to the first lubrication circuit, wherein the controller performs control to operate the second oil supply in accordance with the temperature of the starting frictional engagement element to supply the lubricating oil to the starting frictional engagement element.

6. The lubrication control apparatus according to claim 5, wherein:
   the first lubrication circuit includes a first main lubrication circuit that supplies the lubricating oil to the starting frictional engagement element, and a first lubricating oil increasing circuit branching off from the first main lubrication circuit,
   the first lubricating oil increasing circuit is provided with a first opening-closing valve, and
   the first opening-closing valve is configured to increase a flow rate in the first lubrication circuit by being changed from a closed state to an open state.

7. The lubrication control apparatus according to claim 6, wherein:

the second lubrication circuit includes a second main lubrication circuit that supplies the lubricating oil to the lubricated portion, and a second lubricating oil increasing circuit branching off from the second main lubrication circuit, the second lubricating oil increasing circuit is provided with a second opening-closing valve, and the second opening-closing valve is configured to limit a flow rate in the second lubrication circuit by being changed from an open state to a closed state.

8. The lubrication control apparatus according to claim 7, further comprising a towing mode setter, wherein the controller performs control such that the threshold temperature is changed in accordance with the temperature of the lubricating oil when a towing mode is set by the towing mode setter.

9. The lubrication control apparatus according to claim 8, wherein the first oil supplier is a mechanical oil pump that is mechanically driven by a drive source.

10. The lubrication control apparatus according to claim 9, wherein the second oil supplier is an electrical oil pump that is provided independent of the drive source.

11. The lubrication control apparatus according to claim 10, wherein the starting frictional engagement element is a brake that forms a first gear of the automatic transmission, starts the vehicle through slip control, and then becomes an engaged state.

12. The lubrication control apparatus according to claim 2, further comprising a second oil supplier connected to the first lubrication circuit, wherein the controller performs control to operate the second oil supplier in accordance with the temperature of the starting frictional engagement element to supply the lubricating oil to the starting frictional engagement element.

13. The lubrication control apparatus according to claim 2, wherein:

the first lubrication circuit includes a first main lubrication circuit that supplies the lubricating oil to the starting frictional engagement element, and a first lubricating oil increasing circuit branching off from the first main lubrication circuit, the first lubricating oil increasing circuit is provided with a first opening-closing valve, and the first opening-closing valve is configured to increase a flow rate in the first lubrication circuit by being changed from a closed state to an open state.

14. The lubrication control apparatus according to claim 1, wherein the controller performs control to increase the threshold temperature as the temperature of the lubricating oil increases.

15. The lubrication control apparatus according to claim 1, further comprising an oil cooler that cools the lubricating oil, wherein the second lubrication circuit supplies the lubricating oil to the lubricated portion through the oil cooler.

16. The lubrication control apparatus according to claim 1, further comprising a first oil supplier connected to the first lubrication circuit and the second lubrication circuit, wherein a source pressure of the lubricating oil supplied by the first oil supplier is constant.

17. The lubrication control apparatus according to claim 1, wherein:

the first lubrication circuit includes a first main lubrication circuit that supplies the lubricating oil to the starting frictional engagement element, and a first lubricating oil increasing circuit branching off from the first main lubrication circuit, the first lubricating oil increasing circuit is provided with a first opening-closing valve, and the first opening-closing valve is configured to increase a flow rate in the first lubrication circuit by being changed from a closed state to an open state.

18. The lubrication control apparatus according to claim 1, wherein:

the second lubrication circuit includes a second main lubrication circuit that supplies the lubricating oil to the lubricated portion, and a second lubricating oil increasing circuit branching off from the second main lubrication circuit, the second lubricating oil increasing circuit is provided with a second opening-closing valve, and the second opening-closing valve is configured to limit a flow rate in the second lubrication circuit by being changed from an open state to a closed state.

19. The lubrication control apparatus according to claim 1, further comprising a towing mode setter, wherein the controller performs control such that the threshold is changed in accordance with the temperature of the lubricating oil when a towing mode is set by the towing mode setter.

20. The lubrication control apparatus according to claim 1, wherein the starting frictional engagement element is a brake that forms a first gear of the automatic transmission, starts the vehicle through slip control, and then becomes an engaged state.

\* \* \* \* \*